(12) United States Patent
Raman (10) Patent No.: US 8,479,833 B2
(45) Date of Patent: Jul. 9, 2013

(54) INTEGRATED ENHANCED OIL RECOVERY PROCESS

(75) Inventor: Pattabhi K. Raman, Kildeer, IL (US)

(73) Assignee: Greatpoint Energy, Inc., Cambridge, MA (US)

( * ) Notice: Subject to any disclaimer, the term of this patent is extended or adjusted under 35 U.S.C. 154(b) by 414 days.

(21) Appl. No.: 12/906,547

(22) Filed: Oct. 18, 2010

(65) Prior Publication Data

US 2011/0088897 A1    Apr. 21, 2011

Related U.S. Application Data (60) Provisional application No. 61/252,936, filed on Oct. 19, 2009.

(51) Int. Cl.
*E21B 43/16*    (2006.01)

(52) U.S. Cl.
USPC .......................................... 166/402; 166/90.1

(58) Field of Classification Search
None
See application file for complete search history.

(56) References Cited

U.S. PATENT DOCUMENTS

| | | |
|---|---|---|
| 2,694,623 A | 11/1954 | Welty, Jr. et al. |
| 2,791,549 A | 5/1957 | Jahnig |
| 2,813,126 A | 11/1957 | Tierney |
| 2,860,959 A | 11/1958 | Pettyjohn et al. |
| 2,886,405 A | 5/1959 | Benson et al. |
| 3,034,848 A | 5/1962 | King |
| 3,114,930 A | 12/1963 | Oldham et al. |
| 3,164,330 A | 1/1965 | Neidl |
| 3,351,563 A | 11/1967 | Negra et al. |
| 3,435,590 A | 4/1969 | Smith |
| 3,531,917 A | 10/1970 | Grunewald et al. |
| 3,544,291 A | 12/1970 | Schlinger et al. |
| 3,594,985 A | 7/1971 | Ameen et al. |
| 3,615,300 A | 10/1971 | Holm et al. |
| 3,689,240 A | 9/1972 | Aldridge et al. |
| 3,740,193 A | 6/1973 | Aldridge et al. |
| 3,746,522 A | 7/1973 | Donath |
| 3,759,036 A | 9/1973 | White |
| 3,779,725 A | 12/1973 | Hegarty et al. |
| 3,814,725 A | 6/1974 | Zimmerman et al. |
| 3,817,725 A | 6/1974 | Sieg et al. |
| 3,828,474 A | 8/1974 | Quartulli |
| 3,833,327 A | 9/1974 | Pitzer et al. |
| 3,847,567 A | 11/1974 | Kalina et al. |
| 3,876,393 A | 4/1975 | Kasai et al. |
| 3,904,386 A | 9/1975 | Graboski et al. |
| 3,915,670 A | 10/1975 | Lacey et al. |

(Continued)

FOREIGN PATENT DOCUMENTS

| | | |
|---|---|---|
| CA | 966660 | 4/1975 |
| CA | 1003217 | 1/1977 |

(Continued)

OTHER PUBLICATIONS

U.S. Appl. No. 12/778,538, filed May 12, 2010, Robinson, et al.

(Continued)

*Primary Examiner* — Angela M DiTrani
(74) *Attorney, Agent, or Firm* — McDonnell Boehnen Hulbert & Berghoff LLP (57) ABSTRACT

An enhanced oil recovery process that is integrated with a synthesis gas generation process, such as gasification or methane reforming, involving combined capture and recycle of carbon dioxide from both processes.

20 Claims, 2 Drawing Sheets

U.S. PATENT DOCUMENTS

| | | | |
|---|---|---|---|
| 3,920,229 A | 11/1975 | Piggott | |
| 3,929,431 A | 12/1975 | Koh et al. | |
| 3,958,957 A | 5/1976 | Koh et al. | |
| 3,966,875 A | 6/1976 | Bratzler et al. | |
| 3,969,089 A | 7/1976 | Moss et al. | |
| 3,971,639 A | 7/1976 | Matthews | |
| 3,972,693 A | 8/1976 | Wiesner et al. | |
| 3,975,168 A | 8/1976 | Gorbaty | |
| 3,985,519 A | 10/1976 | Kalina et al. | |
| 3,989,811 A | 11/1976 | Hill | |
| 3,996,014 A | 12/1976 | Muller et al. | |
| 3,998,607 A | 12/1976 | Wesswlhoft et al. | |
| 3,999,607 A | 12/1976 | Pennington et al. | |
| 4,005,996 A | 2/1977 | Hausberger et al. | |
| 4,011,066 A | 3/1977 | Bratzler et al. | |
| 4,017,272 A | 4/1977 | Anwer et al. | |
| 4,021,370 A | 5/1977 | Harris et al. | |
| 4,025,423 A | 5/1977 | Stonner et al. | |
| 4,044,098 A | 8/1977 | Miller et al. | |
| 4,046,523 A | 9/1977 | Kalina et al. | |
| 4,052,176 A * | 10/1977 | Child et al. | 95/161 |
| 4,053,554 A | 10/1977 | Reed et al. | |
| 4,057,512 A | 11/1977 | Vadovic et al. | |
| 4,069,304 A | 1/1978 | Starkovich et al. | |
| 4,077,778 A | 3/1978 | Nahas et al. | |
| 4,091,073 A | 5/1978 | Winkler | |
| 4,092,125 A | 5/1978 | Stambaugh et al. | |
| 4,094,650 A | 6/1978 | Koh et al. | |
| 4,100,256 A | 7/1978 | Bozzelli et al. | |
| 4,101,449 A | 7/1978 | Noda et al. | |
| 4,104,201 A | 8/1978 | Banks et al. | |
| 4,113,615 A | 9/1978 | Gorbaty | |
| 4,116,996 A | 9/1978 | Huang | |
| 4,118,204 A | 10/1978 | Eakman et al. | |
| 4,152,119 A | 5/1979 | Schulz | |
| 4,157,246 A | 6/1979 | Eakman et al. | |
| 4,159,195 A | 6/1979 | Clavenna | |
| 4,162,902 A | 7/1979 | Wiesner et al. | |
| 4,173,465 A | 11/1979 | Meissner et al. | |
| 4,189,307 A | 2/1980 | Marion | |
| 4,193,771 A | 3/1980 | Sharp et al. | |
| 4,193,772 A | 3/1980 | Sharp | |
| 4,200,439 A | 4/1980 | Lang | |
| 4,204,843 A | 5/1980 | Neavel | |
| 4,211,538 A | 7/1980 | Eakman et al. | |
| 4,211,669 A | 7/1980 | Eakman et al. | |
| 4,219,338 A | 8/1980 | Wolfs et al. | |
| 4,225,457 A | 9/1980 | Schulz | |
| 4,235,044 A | 11/1980 | Cheung | |
| 4,243,639 A | 1/1981 | Haas et al. | |
| 4,249,471 A | 2/1981 | Gunnerman | |
| 4,252,771 A | 2/1981 | Lagana et al. | |
| 4,260,421 A | 4/1981 | Brown et al. | |
| 4,265,868 A | 5/1981 | Kamody | |
| 4,270,937 A | 6/1981 | Adler et al. | |
| 4,284,416 A | 8/1981 | Nahas | |
| 4,292,048 A | 9/1981 | Wesselhoft et al. | |
| 4,298,584 A | 11/1981 | Makrides | |
| 4,315,753 A | 2/1982 | Bruckenstein et al. | |
| 4,315,758 A | 2/1982 | Patel et al. | |
| 4,318,712 A | 3/1982 | Lang et al. | |
| 4,322,222 A | 3/1982 | Sass | |
| 4,330,305 A | 5/1982 | Kuessner et al. | |
| 4,331,451 A | 5/1982 | Isogaya et al. | |
| 4,334,893 A | 6/1982 | Lang | |
| 4,336,034 A | 6/1982 | Lang et al. | |
| 4,336,233 A | 6/1982 | Appl et al. | |
| 4,344,486 A | 8/1982 | Parrish | |
| 4,347,063 A | 8/1982 | Sherwood et al. | |
| 4,348,486 A | 9/1982 | Calvin et al. | |
| 4,348,487 A | 9/1982 | Goldstein et al. | |
| 4,353,713 A | 10/1982 | Cheng | |
| 4,365,975 A | 12/1982 | Williams et al. | |
| 4,372,755 A | 2/1983 | Tolman et al. | |
| 4,375,362 A | 3/1983 | Moss | |
| 4,397,656 A | 8/1983 | Ketkar | |
| 4,400,182 A | 8/1983 | Davies et al. | |
| 4,407,206 A | 10/1983 | Bartok et al. | |
| 4,428,535 A | 1/1984 | Venetucci | |
| 4,432,773 A | 2/1984 | Euker, Jr. et al. | |
| 4,433,065 A | 2/1984 | Van Der Burgt et al. | |
| 4,436,028 A | 3/1984 | Wilder | |
| 4,436,531 A | 3/1984 | Estabrook et al. | |
| 4,439,210 A | 3/1984 | Lancet | |
| 4,444,568 A | 4/1984 | Beisswenger et al. | |
| 4,459,138 A | 7/1984 | Soung | |
| 4,462,814 A | 7/1984 | Holmes et al. | |
| 4,466,828 A | 8/1984 | Tamai et al. | |
| 4,468,231 A | 8/1984 | Bartok et al. | |
| 4,478,425 A | 10/1984 | Benko | |
| 4,478,725 A | 10/1984 | Velling et al. | |
| 4,482,529 A | 11/1984 | Chen et al. | |
| 4,491,609 A | 1/1985 | Degel et al. | |
| 4,497,784 A | 2/1985 | Diaz | |
| 4,500,323 A | 2/1985 | Siegfried et al. | |
| 4,505,881 A | 3/1985 | Diaz | |
| 4,508,544 A | 4/1985 | Moss | |
| 4,508,693 A | 4/1985 | Diaz | |
| 4,515,604 A | 5/1985 | Eisenlohr et al. | |
| 4,515,764 A | 5/1985 | Diaz | |
| 4,524,050 A | 6/1985 | Chen et al. | |
| 4,540,681 A | 9/1985 | Kustes et al. | |
| 4,541,841 A | 9/1985 | Reinhardt | |
| 4,551,155 A | 11/1985 | Wood et al. | |
| 4,558,027 A | 12/1985 | McKee et al. | |
| 4,572,826 A | 2/1986 | Moore | |
| 4,594,140 A | 6/1986 | Cheng | |
| 4,597,775 A | 7/1986 | Billimoria et al. | |
| 4,597,776 A | 7/1986 | Ullman et al. | |
| 4,604,105 A | 8/1986 | Aquino et al. | |
| 4,609,388 A | 9/1986 | Adler et al. | |
| 4,609,456 A | 9/1986 | Deschamps et al. | |
| 4,617,027 A | 10/1986 | Lang | |
| 4,619,864 A | 10/1986 | Hendrix et al. | |
| 4,620,421 A | 11/1986 | Brown et al. | |
| 4,661,237 A | 4/1987 | Kimura et al. | |
| 4,668,428 A | 5/1987 | Najjar | |
| 4,668,429 A | 5/1987 | Najjar | |
| 4,675,035 A | 6/1987 | Apffel | |
| 4,678,480 A | 7/1987 | Heinrich et al. | |
| 4,682,986 A | 7/1987 | Lee et al. | |
| 4,690,814 A | 9/1987 | Velenyi et al. | |
| 4,699,632 A | 10/1987 | Babu et al. | |
| 4,704,136 A | 11/1987 | Weston et al. | |
| 4,720,289 A | 1/1988 | Vaugh et al. | |
| 4,747,938 A | 5/1988 | Khan | |
| 4,781,731 A | 11/1988 | Schlinger | |
| 4,803,061 A | 2/1989 | Najjar et al. | |
| 4,808,194 A | 2/1989 | Najjar et al. | |
| 4,810,475 A | 3/1989 | Chu et al. | |
| 4,822,935 A | 4/1989 | Scott | |
| 4,848,983 A | 7/1989 | Tomita et al. | |
| 4,854,944 A | 8/1989 | Strong | |
| 4,861,346 A | 8/1989 | Najjar et al. | |
| 4,861,360 A | 8/1989 | Apffel | |
| 4,872,886 A | 10/1989 | Henley et al. | |
| 4,876,080 A | 10/1989 | Paulson | |
| 4,892,567 A | 1/1990 | Yan | |
| 4,960,450 A | 10/1990 | Schwarz et al. | |
| 4,995,193 A | 2/1991 | Soga et al. | |
| 5,017,282 A | 5/1991 | Delbianco et al. | |
| 5,055,181 A | 10/1991 | Maa et al. | |
| 5,057,294 A | 10/1991 | Sheth et al. | |
| 5,059,406 A | 10/1991 | Sheth et al. | |
| 5,093,094 A | 3/1992 | Van Kleeck et al. | |
| 5,094,737 A | 3/1992 | Bearden, Jr. et al. | |
| 5,132,007 A | 7/1992 | Meyer et al. | |
| 5,223,173 A | 6/1993 | Jeffrey | |
| 5,236,557 A | 8/1993 | Muller et al. | |
| 5,250,083 A | 10/1993 | Wolfenbarger et al. | |
| 5,277,884 A | 1/1994 | Shinnar et al. | |
| 5,435,940 A | 7/1995 | Doering et al. | |
| 5,536,893 A | 7/1996 | Gudmundsson | |
| 5,616,154 A | 4/1997 | Elliott et al. | |
| 5,630,854 A | 5/1997 | Sealock, Jr. et al. | |
| 5,641,327 A | 6/1997 | Leas | |
| 5,660,807 A | 8/1997 | Forg et al. | |

| | | | |
|---|---|---|---|
| 5,670,122 A | 9/1997 | Zamansky et al. |
| 5,720,785 A | 2/1998 | Baker |
| 5,733,515 A | 3/1998 | Doughty et al. |
| 5,769,165 A | 6/1998 | Bross et al. |
| 5,776,212 A | 7/1998 | Leas |
| 5,788,724 A | 8/1998 | Carugati et al. |
| 5,855,631 A | 1/1999 | Leas |
| 5,865,898 A | 2/1999 | Holtzapple et al. |
| 5,968,465 A | 10/1999 | Koveal et al. |
| 6,013,158 A | 1/2000 | Wootten |
| 6,015,104 A | 1/2000 | Rich, Jr. |
| 6,028,234 A | 2/2000 | Heinemann et al. |
| 6,090,356 A | 7/2000 | Jahnke et al. |
| 6,132,478 A | 10/2000 | Tsurui et al. |
| 6,180,843 B1 | 1/2001 | Heinemann et al. |
| 6,187,465 B1 | 2/2001 | Galloway |
| 6,379,645 B1 | 4/2002 | Bucci et al. |
| 6,389,820 B1 | 5/2002 | Rogers et al. |
| 6,506,349 B1 | 1/2003 | Khanmamedov |
| 6,506,361 B1 | 1/2003 | Machado et al. |
| 6,602,326 B2 | 8/2003 | Lee et al. |
| 6,641,625 B1 | 11/2003 | Clawson et al. |
| 6,653,516 B1 | 11/2003 | Yoshikawa et al. |
| 6,692,711 B1 | 2/2004 | Alexion et al. |
| 6,790,430 B1 | 9/2004 | Lackner et al. |
| 6,797,253 B2 | 9/2004 | Lyon |
| 6,808,543 B2 | 10/2004 | Paisley |
| 6,855,852 B1 | 2/2005 | Jackson et al. |
| 6,878,358 B2 | 4/2005 | Vosteen et al. |
| 6,894,183 B2 | 5/2005 | Choudhary et al. |
| 6,955,595 B2 | 10/2005 | Kim |
| 6,955,695 B2 | 10/2005 | Nahas |
| 6,969,494 B2 | 11/2005 | Herbst |
| 7,074,373 B1 | 7/2006 | Warren et al. |
| 7,118,720 B1 | 10/2006 | Mendelsohn et al. |
| 7,132,183 B2 | 11/2006 | Galloway |
| 7,205,448 B2 | 4/2007 | Gajda et al. |
| 7,220,502 B2 | 5/2007 | Galloway |
| 7,309,383 B2 | 12/2007 | Beech, Jr. et al. |
| 7,481,275 B2 | 1/2009 | Olsvik et al. |
| 7,666,383 B2 | 2/2010 | Green |
| 7,897,126 B2 | 3/2011 | Rappas et al. |
| 7,901,644 B2 | 3/2011 | Rappas et al. |
| 7,922,782 B2 | 4/2011 | Sheth |
| 7,926,750 B2 | 4/2011 | Hauserman |
| 7,976,593 B2 | 7/2011 | Graham |
| 2002/0036086 A1 | 3/2002 | Minkkinen et al. |
| 2003/0070808 A1 | 4/2003 | Allison |
| 2003/0131582 A1 | 7/2003 | Anderson et al. |
| 2003/0167691 A1 | 9/2003 | Nahas |
| 2004/0020123 A1 | 2/2004 | Kimura et al. |
| 2004/0180971 A1 | 9/2004 | Inoue et al. |
| 2005/0107648 A1 | 5/2005 | Kimura et al. |
| 2005/0137442 A1 | 6/2005 | Gajda et al. |
| 2005/0287056 A1 | 12/2005 | Baker et al. |
| 2006/0228290 A1 | 10/2006 | Green |
| 2006/0265953 A1 | 11/2006 | Hobbs |
| 2007/0000177 A1 | 1/2007 | Hippo et al. |
| 2007/0051043 A1 | 3/2007 | Schingnitz et al. |
| 2007/0083072 A1 | 4/2007 | Nahas |
| 2007/0180990 A1 | 8/2007 | Downs et al. |
| 2007/0186472 A1 | 8/2007 | Rabovister et al. |
| 2007/0220810 A1 | 9/2007 | Leveson et al. |
| 2007/0227729 A1 | 10/2007 | Zubrin et al. |
| 2007/0237696 A1 | 10/2007 | Payton |
| 2007/0277437 A1 | 12/2007 | Sheth |
| 2007/0282018 A1 | 12/2007 | Jenkins |
| 2009/0048476 A1 | 2/2009 | Rappas et al. |
| 2009/0090055 A1 | 4/2009 | Ohtsuka |
| 2009/0090056 A1 | 4/2009 | Ohtsuka |
| 2009/0165361 A1 | 7/2009 | Rappas et al. |
| 2009/0165376 A1 | 7/2009 | Lau et al. |
| 2009/0165379 A1 | 7/2009 | Rappas |
| 2009/0165380 A1 | 7/2009 | Lau et al. |
| 2009/0165381 A1 | 7/2009 | Robinson |
| 2009/0165382 A1 | 7/2009 | Rappas et al. |
| 2009/0165383 A1 | 7/2009 | Rappas et al. |
| 2009/0165384 A1 | 7/2009 | Lau et al. |
| 2009/0166588 A1 | 7/2009 | Spitz et al. |
| 2009/0169448 A1 | 7/2009 | Rappas et al. |
| 2009/0169449 A1 | 7/2009 | Rappas et al. |
| 2009/0170968 A1 | 7/2009 | Nahas et al. |
| 2009/0173079 A1 | 7/2009 | Wallace et al. |
| 2009/0217575 A1 | 9/2009 | Raman et al. |
| 2009/0217582 A1 | 9/2009 | May et al. |
| 2009/0217584 A1 | 9/2009 | Raman et al. |
| 2009/0217585 A1 | 9/2009 | Raman et al. |
| 2009/0217586 A1 | 9/2009 | Rappas et al. |
| 2009/0217587 A1 | 9/2009 | Raman et al. |
| 2009/0217588 A1 | 9/2009 | Hippo et al. |
| 2009/0217589 A1 | 9/2009 | Robinson |
| 2009/0217590 A1 | 9/2009 | Rappas et al. |
| 2009/0218424 A1 | 9/2009 | Hauserman |
| 2009/0220406 A1 | 9/2009 | Rahman |
| 2009/0229182 A1 | 9/2009 | Raman et al. |
| 2009/0236093 A1 | 9/2009 | Zubrin et al. |
| 2009/0246120 A1 | 10/2009 | Raman et al. |
| 2009/0259080 A1 | 10/2009 | Raman et al. |
| 2009/0260287 A1 | 10/2009 | Lau |
| 2009/0324458 A1 | 12/2009 | Robinson et al. |
| 2009/0324459 A1 | 12/2009 | Robinson et al. |
| 2009/0324460 A1 | 12/2009 | Robinson et al. |
| 2009/0324461 A1 | 12/2009 | Robinson et al. |
| 2009/0324462 A1 | 12/2009 | Robinson et al. |
| 2010/0071235 A1 | 3/2010 | Pan et al. |
| 2010/0071262 A1 | 3/2010 | Robinson et al. |
| 2010/0076235 A1 | 3/2010 | Reiling et al. |
| 2010/0120926 A1 | 5/2010 | Robinson et al. |
| 2010/0121125 A1 | 5/2010 | Hippo et al. |
| 2010/0168494 A1 | 7/2010 | Rappas et al. |
| 2010/0168495 A1 | 7/2010 | Rappas et al. |
| 2010/0179232 A1 | 7/2010 | Robinson et al. |
| 2010/0287835 A1 | 11/2010 | Reiling et al. |
| 2010/0287836 A1 | 11/2010 | Robinson et al. |
| 2010/0292350 A1 | 11/2010 | Robinson et al. |
| 2011/0031439 A1 | 2/2011 | Sirdeshpande et al. |
| 2011/0062012 A1 | 3/2011 | Robinson |
| 2011/0062721 A1 | 3/2011 | Sirdeshpande et al. |
| 2011/0062722 A1 | 3/2011 | Sirdeshpande et al. |
| 2011/0064648 A1 | 3/2011 | Preston et al. |
| 2011/0088896 A1 | 4/2011 | Preston |
| 2011/0088897 A1 | 4/2011 | Raman |
| 2011/0146978 A1 | 6/2011 | Perlman |
| 2011/0146979 A1 | 6/2011 | Wallace |
| 2011/0207002 A1 | 8/2011 | Powell et al. |
| 2011/0217602 A1 | 9/2011 | Sirdeshpande |
| 2011/0262323 A1 | 10/2011 | Rappas et al. |
| 2012/0046510 A1 | 2/2012 | Sirdeshpande |
| 2012/0060417 A1 | 3/2012 | Raman et al. |
| 2012/0102836 A1 | 5/2012 | Raman et al. |
| 2012/0102837 A1 | 5/2012 | Raman et al. |

FOREIGN PATENT DOCUMENTS

| | | |
|---|---|---|
| CA | 1041553 | 10/1978 |
| CA | 1106178 | 8/1981 |
| CA | 1 125 026 | 6/1982 |
| CA | 1187702 | 6/1985 |
| CA | 2713642 | 7/2009 |
| CN | 1477090 | 2/2004 |
| CN | 101555420 | 10/2009 |
| DE | 2 210 891 | 3/1972 |
| DE | 2210891 | 9/1972 |
| DE | 2852710 | 6/1980 |
| DE | 3422202 | 12/1985 |
| DE | 100610607 | 6/2002 |
| EA | 819 | 4/2000 |
| EP | 0024792 | 3/1981 |
| EP | 0 067 580 | 12/1982 |
| EP | 102828 | 3/1984 |
| EP | 0 138 463 | 4/1985 |
| EP | 0 225 146 | 6/1987 |
| EP | 0 259 927 | 3/1988 |
| EP | 0473153 | 3/1992 |
| EP | 0 723 930 | 7/1996 |
| EP | 1 001 002 | 5/2000 |
| EP | 1 207 132 | 5/2002 |
| EP | 1 741 673 | 6/2006 |
| EP | 1768207 | 3/2007 |

| | | |
|---|---|---|
| EP | 2058471 | 5/2009 |
| FR | 797 089 | 4/1936 |
| FR | 2 478 615 | 9/1981 |
| FR | 2906879 | 4/2008 |
| GB | 593910 | 10/1947 |
| GB | 640907 | 8/1950 |
| GB | 676615 | 7/1952 |
| GB | 701 131 | 12/1953 |
| GB | 760627 | 11/1956 |
| GB | 798741 | 7/1958 |
| GB | 820 257 | 9/1959 |
| GB | 996327 | 6/1965 |
| GB | 1033764 | 6/1966 |
| GB | 1448562 | 9/1976 |
| GB | 1453081 | 10/1976 |
| GB | 1467219 | 3/1977 |
| GB | 1467995 | 3/1977 |
| GB | 1 599 932 | 7/1977 |
| GB | 1560873 | 2/1980 |
| GB | 2078251 | 1/1982 |
| GB | 2154600 | 9/1985 |
| GB | 2455864 | 6/2009 |
| JP | 53-94305 | 8/1978 |
| JP | 53-111302 | 9/1978 |
| JP | 54020003 | 2/1979 |
| JP | 54-150402 | 11/1979 |
| JP | 55-12181 | 1/1980 |
| JP | 56-145982 | 11/1981 |
| JP | 56157493 | 12/1981 |
| JP | 60-35092 | 2/1985 |
| JP | 60-77938 | 5/1985 |
| JP | 62241991 | 10/1987 |
| JP | 62 257985 | 11/1987 |
| JP | 2000290659 | 10/2000 |
| JP | 2000290670 | 10/2000 |
| JP | 2002105467 | 4/2002 |
| JP | 2004292200 | 10/2004 |
| JP | 2004298818 | 10/2004 |
| JP | 2006 169476 A | 6/2006 |
| WO | 00/18681 | 4/2000 |
| WO | WO 00/43468 | 7/2000 |
| WO | WO 02/40768 | 5/2002 |
| WO | WO 02/079355 | 10/2002 |
| WO | 02/103157 | 12/2002 |
| WO | 03/018958 | 3/2003 |
| WO | WO 03/033624 | 4/2003 |
| WO | 2004/055323 | 7/2004 |
| WO | WO 2004/072210 | 8/2004 |
| WO | WO 2006/031011 | 3/2006 |
| WO | WO 2007/005284 | 1/2007 |
| WO | WO 2007/047210 | 4/2007 |
| WO | 2007/068682 | 6/2007 |
| WO | 2007/077137 | 7/2007 |
| WO | 2007/077138 | 7/2007 |
| WO | 2007/083072 | 7/2007 |
| WO | WO 2007/076363 | 7/2007 |
| WO | WO 2007/128370 | 11/2007 |
| WO | 2007/143376 | 12/2007 |
| WO | WO 2007/143376 | 12/2007 |
| WO | 2008/058636 | 5/2008 |
| WO | WO 2008/073889 | 6/2008 |
| WO | 2008/087154 | 7/2008 |
| WO | 2009/018053 | 2/2009 |
| WO | WO 2009/018053 | 2/2009 |
| WO | WO 2009/048723 | 4/2009 |
| WO | WO 2009/048724 | 4/2009 |
| WO | WO 2009/086361 | 7/2009 |
| WO | WO 2009/086362 | 7/2009 |
| WO | WO 2009/086363 | 7/2009 |
| WO | WO 2009/086366 | 7/2009 |
| WO | WO 2009/086367 | 7/2009 |
| WO | WO 2009/086370 | 7/2009 |
| WO | WO 2009/086372 | 7/2009 |
| WO | WO 2009/086374 | 7/2009 |
| WO | WO 2009/086377 | 7/2009 |
| WO | WO 2009/086383 | 7/2009 |
| WO | WO 2009/086407 | 7/2009 |
| WO | WO 2009/086408 | 7/2009 |
| WO | WO 2009/111330 | 9/2009 |
| WO | WO 2009/111331 | 9/2009 |
| WO | WO 2009/111332 | 9/2009 |
| WO | WO 2009/111335 | 9/2009 |
| WO | WO 2009/111342 | 9/2009 |
| WO | WO 2009/111345 | 9/2009 |
| WO | WO 2009/124017 | 10/2009 |
| WO | WO 2009/124019 | 10/2009 |
| WO | WO 2009/158576 | 12/2009 |
| WO | WO 2009/158579 | 12/2009 |
| WO | WO 2009/158580 | 12/2009 |
| WO | WO 2009/158582 | 12/2009 |
| WO | WO 2009/158583 | 12/2009 |
| WO | WO 2010/033846 | 3/2010 |
| WO | WO 2010/033848 | 3/2010 |
| WO | WO 2010/033850 | 3/2010 |
| WO | WO 2010/033852 | 3/2010 |
| WO | WO 2010/048493 | 4/2010 |
| WO | WO 2010/078297 | 7/2010 |
| WO | WO 2010/078298 | 7/2010 |
| WO | WO 2010/132551 | 11/2010 |
| WO | 2011/029278 | 3/2011 |
| WO | 2011/029282 | 3/2011 |
| WO | 2011/029283 | 3/2011 |
| WO | 2011/029284 | 3/2011 |
| WO | 2011/029285 | 3/2011 |
| WO | WO 2011/034890 | 3/2011 |
| WO | 2011/063608 | 6/2011 |
| WO | WO 2012/024369 | 2/2012 |

OTHER PUBLICATIONS

U.S. Appl. No. 12/778,548, filed May 12, 2010, Robinson, et al.
U.S. Appl. No. 12/778,552, filed May 12, 2010, Robinson, et al.
Adsorption, http://en.wikipedia.org/wiki/Adsorption, pp. 1-8.
Amine gas treating, http://en.wikipedia.org/wiki/Acid_gas_removal, pp. 1-4.
Coal, http://en.wikipedia.org/wiki/Coal_gasification, pp. 1-8.
Coal Data: A Reference, Energy Information Administration, Office of Coal, Nuclear, Electric, and Alternate Fuels U.S. Department of Energy, DOE/EIA-0064(93), Feb. 1995.
Deepak Tandon, Dissertation Approval, "Low Temperature and Elevated Pressure Steam Gasification of Illinois Coal", Jun. 13, 1996.
Demibras, "Demineralization of Agricultural Residues by Water Leaching", *Energy Sources*, vol. 25, pp. 679-687, (2003).
Fluidized Bed Gasifiers, http://www.energyproducts.com/fluidized_bed_gasifiers.htm, pp. 1-5.
Gas separation, http://en.wikipedia.org/wiki/Gas_separation, pp. 1-2.
Gasification, http://en.wikipedia.org/wiki/Gasification, pp. 1-6.
Gallagher Jr., et al., "Catalytic Coal Gasification for SNG Manufacture", *Energy Research*, vol. 4, pp. 137-147, (1980).
Heinemann, et al., "Fundamental and Exploratory Studies of Catalytic Steam Gasification of Carbonaceous Materials", Final Report Fiscal Years 1985-1994.
Jensen, et al. Removal of K and Cl by leaching of straw char, *Biomass and Bioenergy*, vol. 20, pp. 447-457, (2001).
Mengjie, et al., "A potential renewable energy resource development and utilization of biomass energy", http://www.fao.org.docrep/T4470E/t4470e0n.htm, pp. 1-8.
Meyers, et al. Fly Ash as a Construction Material for Highways, A Manual. Federal Highway Administration, Report No. FHWA-IP-76-16, Washington, DC, 1976.
Coal Bottom Ash/Boiler Slag, http://www.p2pays.org/ref/13/12842/cbabs2.htm.
Natural gas processing, http://en.wikipedia.org/wiki/Natural_gas_processing, pp. 1-4.
Natural Gas Processing: The Crucial Link Between Natural Gas Production and Its Transportation to Market. Energy Information Administration, Office of Oil and Gas; pp. 1-11, (2006).
Prins, et al., "Exergetic optimisation of a production process of Fischer-Tropsch fuels from biomass", *Fuel Processing Technology*, vol. 86, pp. 375-389, (2004).
Reboiler, http://en.wikipedia.org/wiki/Reboiler, pp. 1-4.
What is XPS?, http://www.nuance.northwestern.edu/KeckII/xps1.asp, pp. 1-2.

2.3 Types of gasifiers, http://www.fao.org/docrep/t0512e/T0512e0a.htm, pp. 1-6.
2.4 Gasification fuels, http://www.fao.org/docrep/t0512e/T0512e0b.htm#TopofPage, pp. 1-8.
2.5 Design of downdraught gasifiers, http://www.fao.org/docrep/t0512e/T0512e0c.htm#TopOfPage, pp. 1-8.
2.6 Gas cleaning and cooling, http://www.fao.org/docrep/t0512e0d.htm#TopOFPage, pp. 1-3.
Moulton, Lyle K. "Bottom Ash and Boiler Slag", *Proceedings of the Third International Ash Utilization Symposium*, U.S. Bureau of Mines, Information Circular No. 8640, Washington, DC, 1973.
A.G. Collot et al., "Co-pyrolysis and co-gasification of coal and biomass in bench-scale fixed-bed and fluidized bed reactors", (1999) Fuel 78, pp. 667-679.
Wenkui Zhu et al., "Catalytic gasification of char from co-pyrolysis of coal and biomass", (2008) Fuel Processing Technology, vol. 89, pp. 890-896.
Chiesa P. et al., "Co-Production of hydrogen, electricity and C02 from coal with commercially ready technology. Part A: Performance and emissions", (2005) International Journal of Hydrogen Energy, vol. 30, No. 7, pp. 747-767.
Brown et al., "Biomass-Derived Hydrogen From a Thermally Ballasted Gasifier", DOE Hydrogen Program Contractors' Review meeting, May 18-21, 2003, Center for Sustainable Environmental Technologies Iowa State University.
Brown et al., "Biomass-Derived Hydrogen From a thermally Ballasted Gasifier", Final Technical Report, Iowa State University, Aug. 2005.
Chiaramonte et al, "Upgrade Coke by Gasification", (1982) Hydrocarbon Processing, vol. 61 (9), pp. 255-257 (Abstract only).
Gerdes, Kristin, et al., "Integrated Gasification Fuel Cell Performance and Cost Assessment," National Energy Technology Laboratory, U.S. Department of Energy, Mar. 27, 2009, pp. 1-26.
Ghosh, S., et al., "Energy Analysis of a Cogeneration Plant Using Coal Gasification and Solid Oxide Fuel Cell," Energy, 2006, vol. 31, No. 2-3, pp. 345-363.
Jeon, S.K., et al., "Characteristics of Steam Hydrogasification of Wood Using a Micro-Batch Reactor," Fuel, 2007, vol. 86, pp. 2817-2823.
Li, Mu, et al., "Design of Highly Efficient Coal-Based Integrated Gasification Fuel Cell Power Plants," Journal of Power Sources, 2010, vol. 195, pp. 5707-5718.
Prins, M.J., et al., "Exergetic Optimisation of a Production Process of Fischer-Tropsch Fuels from Biomass," Fuel Processing Technology, 2005, vol. 86, No. 4, pp. 375-389.
U.S. Appl. No. 13/484,918, filed May 31, 2012.
U.S. Appl. No. 13/402,022, filed Feb. 22, 2012.
U.S. Appl. No. 13/450,995, filed Apr. 19, 2012.
Asami, K., et al., "Highly Active Iron Catalysts from Ferric Chloride or the Steam Gasification of Brown Coal," ind. Eng. Chem. Res., vol. 32, No. 8, 1993, pp. 1631-1636.
Berger, R., et al., "High Temperature $CO_2$-Absorption: A Process Offering New Prospects in Fuel Chemistry," The Fifth International Symposium on Coal Combustion, Nov. 2003, Nanjing, China, pp. 547-549.
Brown et al., "Biomass-Derived Hydrogen From a Thermally Ballasted Gasifier," Aug. 2005.
Brown et al., "Biomass-Derived Hydrogen From a Thermally Ballasted Gasifier," DOE Hydrogen Program Contractors' Review Metting, Center for Sustainable Environmental Technologies, Iowa State University, May 21, 2003.
Coal Conversion Processes (Gasification), Encyclopedia of Chemical Technology, 4th Edition, vol. 6, pp. 541-566.
Cohen, S.J., Project Manager, "Large Pilot Plant Alternatives for Scaleup of the Catalytic Coal Gasification Process," FE-2480-20, U.S. Dept. of Energy, Contract No., EX-76-C-01-2480, 1979.
Euker, Jr., C.A., Reitz, R.A., Program Managers, "Exxon Catalytic Coal-Gasification-Process Development Program," Exxon Research & Engineering Company, FE-2777-31, U.S. Dept. of Energy, Contract No. ET-78-C-01-2777, 1981.
Kalina, T., Nahas, N. C., Project Managers, "Exxon Catalaytic Coal Gasification Process Predevelopment Program," Exxon Research & Engineering Company, FE-2369-24, U.S. Dept. of Energy, Contract No., E(49-18)-2369, 1978.
Nahas, N. C., "Exxon Catalytic Coal Gasification Process—Fundamentals to Flowsheets," Fuel, vol. 62, No. 2, 1983, pp. 239-241.
Ohtsuka, Y. et al., "Highly Active Catalysts from Inexpensive Raw Materials for Coal Gasification," Catalysis Today, vol. 39, 1997, pp. 111-125.
Ohtsuka, Yasuo et al, "Steam Gasification of Low-Rank Coals with a Chlorine-Free Iron Catalyst from Ferric Chloride," Ind. Eng. Chem. Res., vol. 30, No. 8, 1991, pp. 1921-1926.
Ohtsuka, Yasuo et al., "Calcium Catalysed Steam Gasification of Yalourn Brown Coal," Fuel, vol. 65, 1986, pp. 1653-1657.
Ohtsuka, Yasuo, et al, "Iron-Catalyzed Gasification of Brown Coal at Low Temperatures," Energy & Fuels, vol. 1, No. 1, 1987, pp. 32-36.
Ohtsuka, Yasuo, et al., "Ion-Exchanged Calcium From Calcium Carbonate and Low-Rank Coals: High Catalytic Activity in Steam Gasification," Energy & Fuels 1996, 10, pp. 431-435.
Ohtsuka, Yasuo et al., "Steam Gasification of Coals with Calcium Hydroxide," Energy & Fuels, vol. 9, No. 6, 1995, pp. 1038-1042.
Pereira, P., et al., "Catalytic Steam Gasification of Coals," Energy & Fuels, vol. 6, No. 4, 1992, pp. 407-410.
Ruan Xiang-Quan, et al., "Effects of Catalysis on Gasification of Tatong Coal Char," Fuel, vol. 66, Apr. 1987, pp. 568-571.
Tandon, D., "Low Temperature and Elevated Pressure Steam Gasification of Illinois Coal," College of Engineering in the Graduate School, Southern Illinois university at Carbondale, Jun. 1996.
"Integrate Gasification Combined Cycle (IGCC)," WorleyParsons Resources & Energy, http://www.worleyparsons.com/v5/page.aspx?id=164.

* cited by examiner

INTEGRATED ENHANCED OIL RECOVERY PROCESS

CROSS REFERENCE TO RELATED APPLICATION

This application claims priority under 35 U.S.C. §119 from U.S. Provisional Application Ser. No. 61/252,936 (filed 19 Oct. 2009), the disclosure of which is incorporated by reference herein for all purposes as if fully set forth.

This application is related to commonly-owned US Provisional Applications Serial Nos. 12/906,552 (entitled INTEGRATED ENHANCED OIL RECOVERY PROCESS, published as US2011/0088896A1), filed concurrently herewith.

FIELD OF THE INVENTION

The present invention relates to an enhanced oil recovery process that is integrated with a synthesis gas generation process, such as gasification or reforming, involving combined capture and recycle of carbon dioxide from both processes.

BACKGROUND OF THE INVENTION

In view of dwindling supplies of crude oil, enhanced oil recovery (EOR) techniques are receiving renewed attention.

Typically, oil is produced using the natural pressure of an oil reservoir to drive the crude into the well bore from where it is brought to the surface with conventional pumps. After some period of production, the natural pressure of the oil reservoir decreases and production dwindles. In the 1940s, producers incorporated secondary recovery by utilizing injected water, steam and/or natural gas to drive the crude to the well bore prior to pumping it to the surface.

Once the easily extracted oil already has been recovered, producers may turn to tertiary or enhanced oil recovery (EOR) techniques. One known such EOR technique is high-pressure $CO_2$ injection, which helps to repressurize the oil reservoir. The high-pressure $CO_2$ also acts as a solvent, dissolving the residual oil, thereby reducing its viscosity and improving its flow characteristics, allowing it to be pumped out of an aging reservoir.

One difficulty with the use of $CO_2$ to increase oil production is that it requires large quantities of $CO_2$, and the availability of such large quantities of $CO_2$ is limited.

$CO_2$ from natural sources can be utilized, but generally requires the natural source to be in the proximity of the oil reservoir to avoid the construction and use of pipelines, which could make such use uneconomical.

Use of $CO_2$ from combustion sources (such as power plants) has also been considered (see, for example, U.S. Pat. No. 7,299,868 and publications cited therein), but the separation of $CO_2$ from the combustion gases is difficult and generally not considered economical.

More recently, $CO_2$ from synthesis gas production operations has been considered for use in EOR. See, for example, U.S. Pat. No. 7,481,275. Synthesis gas production operations include, for example, catalytic gasification and hydromethanation processes, non-catalytic gasification processes and methane reforming processes. These processes typically produce one or more of methane, hydrogen and/or syngas (a mixture of hydrogen and carbon monoxide) as a raw gas product, which can be processed and ultimately used for power generation and/or other industrial applications. These processes also produce $CO_2$, which is removed via acid gas removal processes, as is generally known to those of ordinary skill in the relevant art. Historically, this $CO_2$ has simply been vented to the atmosphere but, in view of environmental concerns, capture and sequestration/use of this $CO_2$ is becoming a necessity. EOR is thus a logical outlet for $CO_2$ streams from synthesis gas production operations.

At least one such synthesis gas production operation which utilizes a $CO_2$ by-product stream for EOR currently exists at the Great Plains Synfuels Plant (near Beulah, North Dakota USA). At this facility, coal/lignite is gasified to a synthesis gas stream containing carbon dioxide, which is separated via a solvent-based acid gas removal technique. The resulting $CO_2$ stream (which is greater than 95% pure) is compressed and transported via a 205-mile supercritical $CO_2$ pipeline to oil fields in Canada for use in EOR operations. This operation is described in more detail in Perry and Eliason, "$CO_2$ Recovery and Sequestration at Dakota Gasification Company" (October 2004), available on the Dakota Gasification Company website.

A disadvantage in this operation is the pipeline, as supercritical $CO_2$ is considered a hazardous material. The construction, permitting, operation and maintenance of a supercritical $CO_2$ pipeline, particularly one as long as 205 miles, is expensive. A more advantageous way to get the $CO_2$ from the synthesis gas operation to the EOR site would, therefore, be highly desirable.

Another disadvantage to the use of $CO_2$ for EOR is that, as more $CO_2$ is pumped into an oil reservoir, more $CO_2$ is also produced along with the other liquids and gases that come out of the well. Traditionally, $CO_2$ that is co-produced with oil is separated and vented to the atmosphere; however, as with synthesis gas production operations, environmental concerns make this $CO_2$ venting undesirable.

It would, therefore, be highly desirable to integrate synthesis gas production processes with EOR processes in a way that minimizes the release of $CO_2$ into the atmosphere (maximizes capture and sequestration of $CO_2$), reduces the need for long $CO_2$ transport pipelines, and improves the overall integration, efficiency and economics of the two processes. The present invention provides such an integration.

SUMMARY OF THE INVENTION

In a first aspect, the present invention provides an integrated process to (i) produce an acid gas-depleted gaseous hydrocarbon product steam, (ii) produce an acid gas-depleted synthesis gas stream, (iii) produce a liquid hydrocarbon product stream and (iv) enhance production of a hydrocarbon-containing fluid from an underground hydrocarbon reservoir, the process comprising the steps of:

(1) injecting a pressurized carbon dioxide stream into an underground hydrocarbon reservoir to enhance production of the hydrocarbon-containing fluid from the underground hydrocarbon reservoir via a hydrocarbon production well, the hydrocarbon-containing fluid comprising carbon dioxide;

(2) recovering the hydrocarbon-containing fluid produced from the hydrocarbon production well;

(3) separating the hydrocarbon-containing fluid into (a) the liquid hydrocarbon product stream and (b) a gaseous hydrocarbon stream comprising carbon dioxide;

(4) treating the gaseous hydrocarbon stream in a first acid gas absorber unit to produce the acid gas-depleted gaseous hydrocarbon product stream and a first acid gas-rich absorber stream;

(5) producing a synthesis gas stream from a carbonaceous feedstock, the synthesis gas stream comprising (a) at least one of carbon monoxide and carbon dioxide, and (b) at least one of hydrogen and methane;

(6) treating the synthesis gas stream in a second acid gas absorber unit to produce the acid gas-depleted synthesis gas stream and a second acid gas-rich absorber stream;

(7) feeding the first acid gas-rich absorber stream and the second acid gas-rich absorber stream into an absorber regeneration unit to produce a carbon dioxide-rich recycle stream and an acid gas-lean absorber stream; and (8) pressurizing the carbon dioxide-rich recycle stream to generate the pressurized carbon dioxide stream.

In a second aspect, the present invention provides a process to enhance production of a hydrocarbon-containing fluid from an underground hydrocarbon reservoir via a hydrocarbon production well, by injecting a pressurized carbon dioxide stream into an underground hydrocarbon reservoir, wherein the hydrocarbon-containing fluid comprises carbon dioxide, and wherein the pressurized carbon dioxide stream is generated by a process comprising the steps of:

(I) recovering the hydrocarbon-containing fluid produced from the hydrocarbon production well;

(II) splitting the hydrocarbon-containing fluid into (a) a liquid hydrocarbon product stream and (b) a gaseous hydrocarbon stream comprising carbon dioxide;

(III) treating the gaseous hydrocarbon stream in a first acid gas absorber unit to produce an acid gas-depleted gaseous hydrocarbon product stream and a first acid gas-rich absorber stream;

(IV) producing a synthesis gas stream from a carbonaceous feedstock, the synthesis gas stream comprising (a) at least one of carbon monoxide and carbon dioxide, and (b) at least one of hydrogen and methane;

(V) treating the synthesis gas stream in a second acid gas absorber unit to produce an acid gas-depleted synthesis gas stream and a second acid gas-rich absorber stream;

(VI) feeding the first acid gas-rich absorber stream and the second acid gas-rich absorber stream into an absorber regeneration unit to produce a carbon dioxide-rich recycle stream and an acid gas-lean absorber stream; and (VII) pressurizing the carbon dioxide-rich recycle stream to generate the pressurized carbon dioxide stream.

In a third aspect, the invention provides an apparatus for generating a liquid hydrocarbon product stream, an acid gas-depleted gaseous hydrocarbon product stream and an acid gas-depleted synthesis gas stream, the apparatus comprising:

(A) a synthesis gas production system adapted to produce a synthesis gas from a carbonaceous feedstock, the synthesis gas comprising (i) at least one of carbon monoxide and carbon dioxide, and (ii) at least one of hydrogen and methane;

(B) a carbon dioxide injection well in fluid communication with an underground hydrocarbon reservoir, the carbon dioxide injection well adapted to inject a pressurized carbon dioxide stream into the underground hydrocarbon reservoir for enhanced oil recovery;

(C) a hydrocarbon production well in fluid communication with the underground hydrocarbon reservoir, the hydrocarbon production well adapted to remove a hydrocarbon fluid from the underground hydrocarbon reservoir, the hydrocarbon fluid comprising carbon dioxide;

(D) a separation device in fluid communication with the hydrocarbon production well, the separation device adapted (i) to receive the hydrocarbon fluid from the hydrocarbon production well, and (ii) to separate the hydrocarbon fluid into the liquid hydrocarbon product stream and a gaseous hydrocarbon stream comprising carbon dioxide;

(E) a first acid gas absorber unit in fluid communication with the separation device, the first acid gas absorber unit adapted to (i) receive the gaseous hydrocarbon stream from the separation device, and (ii) treat the gaseous hydrocarbon stream to remove acid gases and produce the acid gas-depleted gaseous hydrocarbon product stream and a first acid gas-rich absorber stream;

(F) a second acid gas absorber unit in fluid communication with the synthesis gas generation system, the second acid gas absorber unit adapted to (i) receive the synthesis gas from the synthesis gas generation system, and (ii) treat the synthesis gas to remove acid gases and produce the acid gas-depleted synthesis gas stream and a second acid gas-rich absorber stream;

(G) an absorber regeneration unit in fluid communication with the first acid gas absorber unit and the second acid gas absorber unit, the absorber regeneration unit adapted to (i) receive the first acid gas-rich absorber stream from the first acid gas absorber unit and the second acid gas-rich absorber stream from the second acid gas absorber unit, (ii) remove acid gases from the first acid gas-rich absorber stream and the second acid gas-rich absorber stream, and (iii) generate an acid gas-lean absorber stream and a carbon dioxide-rich recycle stream; and (H) a compressor unit in fluid communication with the absorber regeneration unit and the carbon dioxide injection well, the compressor unit adapted to (i) receive the carbon dioxide-rich recycle stream, and (ii) compress the carbon dioxide recycle stream to generate the pressurized carbon dioxide stream, and (iii) provide the pressurized carbon dioxide stream to the carbon dioxide injection well.

These and other embodiments, features and advantages of the present invention will be more readily understood by those of ordinary skill in the art from a reading of the following detailed description.

DETAILED DESCRIPTION

The present disclosure relates to integrating synthesis gas production processes with enhanced oil recovery processes. Further details are provided below.

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Although methods and materials similar or equivalent to those described herein can be used in the practice or testing of the present disclosure, suitable methods and materials are described herein.

Unless stated otherwise, all percentages, parts, ratios, etc., are by weight.

Unless stated otherwise, pressures expressed in psi units are gauge, and pressures expressed in kPa units are absolute.

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The term "substantial portion", as used herein, unless otherwise defined herein, means that greater than about 90% of the referenced material, preferably greater than about 95% of the referenced material, and more preferably greater than about 97% of the referenced material. The percent is on a molar basis when reference is made to a molecule (such as methane, carbon dioxide, carbon monoxide and hydrogen sulfide), and otherwise is on a weight basis (such as the liquid component of the hydrocarbon-containing fluid).

The term "predominant portion", as used herein, unless otherwise defined herein, means that greater than about 50% of the referenced material. The percent is on a molar basis when reference is made to a molecule (such as hydrogen, methane, carbon dioxide, carbon monoxide and hydrogen sulfide), and otherwise is on a weight basis (such as the liquid component of the hydrocarbon-containing fluid).

The term "hydrocarbon-containing fluid", as used herein, means a fluid comprising any hydrocarbon liquid and/or gas. A hydrocarbon-containing fluid may also comprise solid particles. Oil, gas-condensate and the like, and also their mixtures with other liquids such as water, may be examples of a liquid contained in a hydrocarbon-containing fluid. Any gaseous hydrocarbon (for example, methane, ethane, propane, propylene, butane or the like), and mixtures of gaseous hydrocarbons, may be contained in a hydrocarbon-containing fluid. In the context of the present invention, the hydrocarbon-containing fluid is recovered from an underground hydrocarbon reservoir, such as an oil-bearing formation, a gas-condensate reservoir, a natural gas reservoir and the like.

The term "carbonaceous" as used herein is synonymous with hydrocarbon.

The term "carbonaceous material" as used herein is a material containing organic hydrocarbon content. Carbonaceous materials can be classified as biomass or non-biomass materials as defined herein.

The term "biomass" as used herein refers to carbonaceous materials derived from recently (for example, within the past 100 years) living organisms, including plant-based biomass and animal-based biomass. For clarification, biomass does not include fossil-based carbonaceous materials, such as coal. For example, see US2009/0217575A1 and US2009/0217587A1.

The term "plant-based biomass" as used herein means materials derived from green plants, crops, algae, and trees, such as, but not limited to, sweet sorghum, bagasse, sugarcane, bamboo, hybrid poplar, hybrid willow, albizia trees, eucalyptus, alfalfa, clover, oil palm, switchgrass, sudangrass, millet, jatropha, and miscanthus (e.g., Miscanthus×giganteus). Biomass further include wastes from agricultural cultivation, processing, and/or degradation such as corn cobs and husks, corn stover, straw, nut shells, vegetable oils, canola oil, rapeseed oil, biodiesels, tree bark, wood chips, sawdust, and yard wastes.

The term "animal-based biomass" as used herein means wastes generated from animal cultivation and/or utilization. For example, biomass includes, but is not limited to, wastes from livestock cultivation and processing such as animal manure, guano, poultry litter, animal fats, and municipal solid wastes (e.g., sewage).

The term "non-biomass", as used herein, means those carbonaceous materials which are not encompassed by the term "biomass" as defined herein. For example, non-biomass include, but is not limited to, anthracite, bituminous coal, sub-bituminous coal, lignite, petroleum coke, asphaltenes, liquid petroleum residues or mixtures thereof. For example, see US2009/0166588A1, US2009/0165379A1, US2009/0165380A1, US2009/0165361A1, US2009/0217590A1 and US2009/0217586A1.

The terms "petroleum coke" and "petcoke" as used here include both (i) the solid thermal decomposition product of high-boiling hydrocarbon fractions obtained in petroleum processing (heavy residues—"resid petcoke"); and (ii) the solid thermal decomposition product of processing tar sands (bituminous sands or oil sands—"tar sands petcoke"). Such carbonization products include, for example, green, calcined, needle and fluidized bed petcoke.

Resid petcoke can also be derived from a crude oil, for example, by coking processes used for upgrading heavy-gravity residual crude oil, which petcoke contains ash as a minor component, typically about 1.0 wt % or less, and more typically about 0.5 wt % of less, based on the weight of the coke. Typically, the ash in such lower-ash cokes comprises metals such as nickel and vanadium.

Tar sands petcoke can be derived from an oil sand, for example, by coking processes used for upgrading oil sand. Tar sands petcoke contains ash as a minor component, typically in the range of about 2 wt % to about 12 wt %, and more typically in the range of about 4 wt % to about 12 wt %, based on the overall weight of the tar sands petcoke. Typically, the ash in such higher-ash cokes comprises materials such as silica and/or alumina.

Petroleum coke has an inherently low moisture content, typically, in the range of from about 0.2 to about 2 wt % (based on total petroleum coke weight); it also typically has a very low water soaking capacity to allow for conventional catalyst impregnation methods. The resulting particulate compositions contain, for example, a lower average moisture content which increases the efficiency of downstream drying operation versus conventional drying operations.

The petroleum coke can comprise at least about 70 wt % carbon, at least about 80 wt % carbon, or at least about 90 wt % carbon, based on the total weight of the petroleum coke. Typically, the petroleum coke comprises less than about 20 wt % inorganic compounds, based on the weight of the petroleum coke.

The term "asphaltene" as used herein is an aromatic carbonaceous solid at room temperature, and can be derived, for example, from the processing of crude oil and crude oil tar sands.

The term "coal" as used herein means peat, lignite, sub-bituminous coal, bituminous coal, anthracite, or mixtures thereof. In certain embodiments, the coal has a carbon content of less than about 85%, or less than about 80%, or less than about 75%, or less than about 70%, or less than about 65%, or less than about 60%, or less than about 55%, or less than about 50% by weight, based on the total coal weight. In other embodiments, the coal has a carbon content ranging up to about 85%, or up to about 80%, or up to about 75% by weight, based on the total coal weight. Examples of useful coal include, but are not limited to, Illinois #6, Pittsburgh #8, Beulah (ND), Utah Blind Canyon, and Powder River Basin (PRB) coals. Anthracite, bituminous coal, sub-bituminous coal, and lignite coal may contain about 10 wt %, from about 5 to about 7 wt %, from about 4 to about 8 wt %, and from about 9 to about 11 wt %, ash by total weight of the coal on a dry basis, respectively. However, the ash content of any particular coal source will depend on the rank and source of the coal, as is familiar to those skilled in the art. See, for example, "Coal Data: A Reference", Energy Information Administration, Office of Coal, Nuclear, Electric and Alternate Fuels, U.S. Department of Energy, DOE/EIA-0064(93), February 1995.

The ash produced from combustion of a coal typically comprises both a fly ash and a bottom ash, as are familiar to those skilled in the art. The fly ash from a bituminous coal can comprise from about 20 to about 60 wt % silica and from about 5 to about 35 wt % alumina, based on the total weight of the fly ash. The fly ash from a sub-bituminous coal can comprise from about 40 to about 60 wt % silica and from about 20 to about 30 wt % alumina, based on the total weight of the fly ash. The fly ash from a lignite coal can comprise from about 15 to about 45 wt % silica and from about 20 to about 25 wt % alumina, based on the total weight of the fly ash. See, for example, Meyers, et al. "Fly Ash. A Highway Construction Material," Federal Highway Administration, Report No. FHWA-IP-76-16, Washington, D.C., 1976.

The bottom ash from a bituminous coal can comprise from about 40 to about 60 wt % silica and from about 20 to about 30 wt % alumina, based on the total weight of the bottom ash. The bottom ash from a sub-bituminous coal can comprise from about 40 to about 50 wt % silica and from about 15 to about 25 wt % alumina, based on the total weight of the bottom ash. The bottom ash from a lignite coal can comprise from about 30 to about 80 wt % silica and from about 10 to about 20 wt % alumina, based on the total weight of the bottom ash. See, for example, Moulton, Lyle K. "Bottom Ash and Boiler Slag," Proceedings of the Third International Ash Utilization Symposium, U.S. Bureau of Mines, Information Circular No. 8640, Washington, D.C., 1973.

A carbonaceous material such as methane can be biomass or non-biomass under the above definitions depending on its source of origin.

The term "unit" refers to a unit operation. When more than one "unit" is described as being present, those units are operated in a parallel fashion. A single "unit", however, may comprise more than one of the units in series, or in parallel, depending on the context. For example, an acid gas removal unit may comprise a hydrogen sulfide removal unit followed in series by a carbon dioxide removal unit. As another example, a contaminant removal unit may comprise a first removal unit for a first contaminant followed in series by a second removal unit for a second contaminant. As yet another example, a compressor may comprise a first compressor to compress a stream to a first pressure, followed in series by a second compressor to further compress the stream to a second (higher) pressure.

The materials, methods, and examples herein are illustrative only and, except as specifically stated, are not intended to be limiting.

General Process Information

Figure 1:
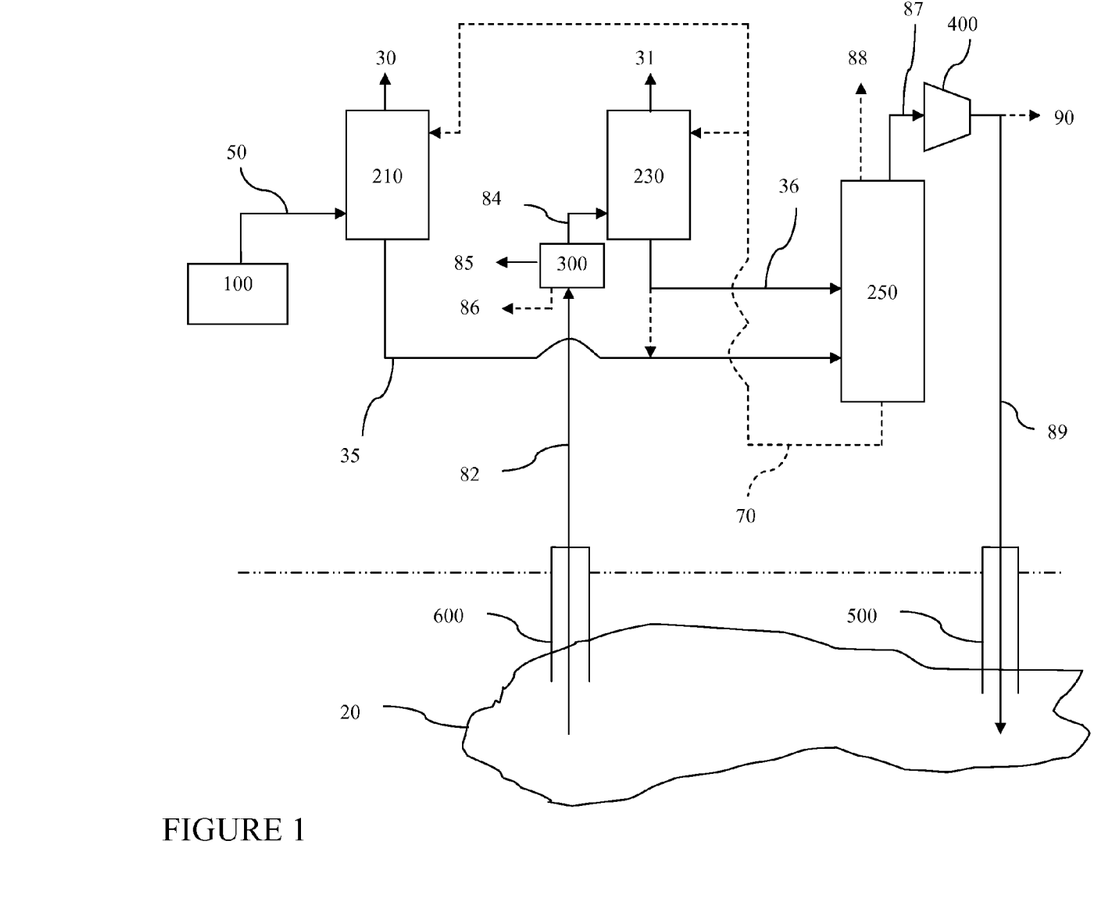
FIG. 1 is a diagram of an embodiment of an integrated process in accordance with the present invention.
Figure 2:
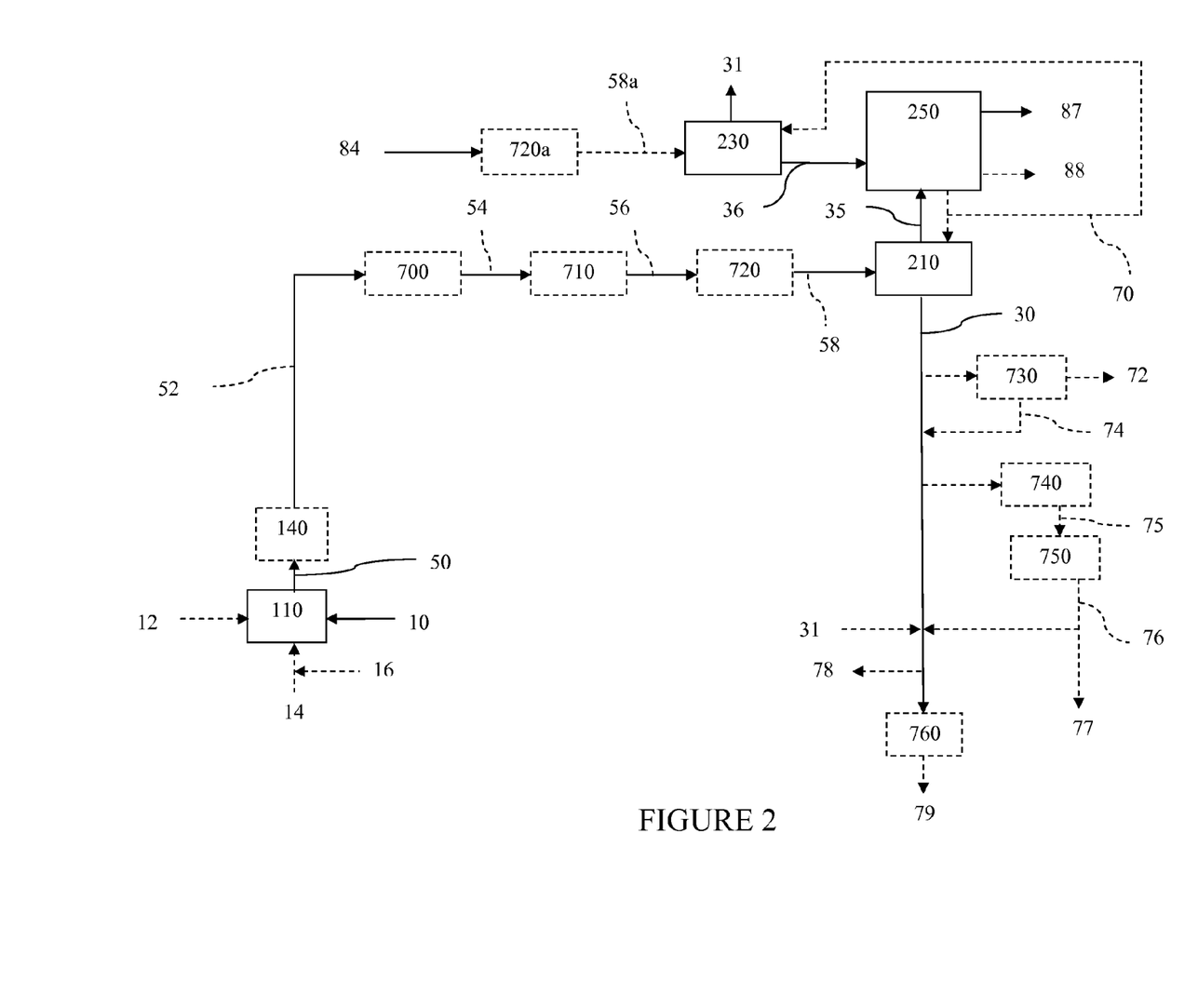
FIG. 2 is a diagram of an embodiment of the gas processing portion of the overall integrated process.

In one embodiment of the invention, an acid gas-depleted gaseous hydrocarbon product stream (31), an acid gas-depleted synthesis gas stream (30) and a liquid hydrocarbon product stream (85) are produced in an integrated EOR and synthesis gas production process as illustrated in FIGS. 1 and 2.

Enhanced Oil Recovery

Referring to FIG. 1, the EOR portion of the process involves injecting a pressurized carbon dioxide stream (89) via an injection well (500) (one or more) into an underground hydrocarbon reservoir (20) utilizing techniques well known to those of ordinary skill in the relevant art. As indicated above, the pressurized carbon dioxide stream (89), which will typically be in a supercritical fluid state, serves to enhance production of a hydrocarbon fluid (82) from a production well (600) through a combination of mechanisms typically involving a repressurization of the underground reservoir and a viscosity reduction of the trapped hydrocarbon (improving flow properties). Typically, the pressurized carbon dioxide stream (89) will be injected into the underground reservoir at a pressure of at least about 1200 psig (about 8375 kPa), or at least about 1500 psig (about 10444 kPa), or at least about 2000 psig (about 13891 kPa).

As is well-known to those of ordinary skill in the art, carbon dioxide-based EOR can also involve co-injection of pressurized water, steam, nitrogen and other fluids, or alternating injections of a pressurized carbon dioxide-rich stream, a water/steam stream and/or a nitrogen stream. The actual carbon dioxide-based EOR process utilized is not critical to the present invention in its broadest sense.

The resulting hydrocarbon-containing fluid (82) is produced and recovered through a hydrocarbon production well (600) (one or more). The produced hydrocarbon-containing fluid (82) will typically contain liquid and gas hydrocarbon components, as well as other liquid and gaseous components depending on the hydrocarbon reservoir and EOR conditions. The liquid hydrocarbon component can generally be considered as a crude oil, while the gaseous hydrocarbon component will typically comprise hydrocarbons that are gases at ambient conditions, such as methane, ethane, propane, propylene and butane (typical components of natural gas). Other typical liquid components include water or brine. The hydrocarbon-containing fluid (82) will also comprise carbon dioxide, and may comprise other gaseous components such as hydrogen sulfide (from a sour well) and nitrogen. The hydrocarbon-containing fluid (82) may also include solid carbon and mineral matter.

The produced hydrocarbon-containing fluid (82) is passed to a separation device (300) to separate the gaseous components from the liquid/solid components to generate a gaseous hydrocarbon stream (84), a liquid hydrocarbon product stream (85) and, optionally, a stream (86) containing solids components from the hydrocarbon-containing fluid (82). The solids may also optionally be carried with the liquid hydrocarbon product stream (85) for later separation, or separated out prior to separation device (300), by well-known techniques such as settling, centrifugation and/or filtration. In one embodiment, larger/denser solids are separated in conjunction with separation device (300), and finer solids that may become entrained in liquid hydrocarbon product stream (85) are separated subsequently through well-known techniques such as filtration.

Suitable separation devices for use as separation device (300) are well known to those of ordinary skill in the art and include, for example, single and multistage horizontal separators and cyclones. The actual separation device utilized is not critical to the present invention in its broadest sense.

The liquid hydrocarbon product stream (85), consequently, will typically comprise at least a predominant portion (or a substantial portion, or substantially all) of the liquid components from the hydrocarbon-containing fluid (82) including, for example, crude oil and water/brine. The liquid hydrocarbon product stream (85) can subsequently be processed to separate out the water and other contaminants, then further processed (e.g., refined) to a variety of end products or for a variety of end uses, as is well-known to those or ordinary skill in the relevant art.

If a stream (86) containing solids components is present, that will typically be removed from separation device (300) as a concentrated slurry or with some portion of the liquid content of the hydrocarbon-containing fluid (82). Oil that may be withdrawn with the solids in stream (86) can be recovered from the solids via washing or other techniques well-known to those of ordinary skill in the relevant art.

The resulting gaseous hydrocarbon stream (84) exiting separation device (300) typically comprises at least a substantial portion (or substantially all) of the gaseous components from the hydrocarbon-containing fluid (82), including at least a substantial portion (or substantially all) of the gaseous hydrocarbons and carbon dioxide from the hydrocarbon-containing fluid (82). The gaseous hydrocarbon stream (84) may also comprise minor amounts of water vapor, which should be substantially removed prior to treatment in the first acid gas absorber unit (230) as discussed below, as well as minor amount of other contaminants such as hydrogen sulfide.

The gaseous hydrocarbon stream (84) exiting separation device (300) is ultimately processed with synthesis gas stream (50) in an acid gas removal unit as discussed below. Prior to processing in the acid gas removal unit, gaseous hydrocarbon stream (84) may optionally be compressed or heated (not depicted) to temperature and pressure conditions suitable for optional downstream processing as further described below.

Synthesis Gas Generation (100)

Synthesis gas stream (50) contains (i) at least one of carbon monoxide and carbon dioxide, and (ii) at least one of hydrogen and methane. The actual composition of synthesis gas stream (50) will depend on the synthesis gas process and carbonaceous feedstock utilized to generate the stream, including any gas processing that may occur before acid gas removal.

In one embodiment, synthesis gas stream (50) comprises carbon dioxide and hydrogen. In another embodiment, synthesis gas stream (50) comprises carbon dioxide and methane. In another embodiment, synthesis gas stream (50) comprises carbon dioxide, methane and hydrogen. In another embodiment, synthesis gas stream (50) comprises carbon monoxide and hydrogen. In another embodiment, synthesis gas stream (50) comprises carbon monoxide, methane and hydrogen. In another embodiment, synthesis gas stream (50) comprises carbon dioxide, carbon monoxide, methane and hydrogen. The synthesis gas stream (50) may also contain other gaseous components such as, for example, hydrogen sulfide, steam and other gaseous hydrocarbons again depending on the synthesis gas production process and carbonaceous feedstock.

Any synthesis gas generating process can be utilized in the context of the present invention, so long as the synthesis gas generating process (including gas processing prior to acid gas removal) results in a synthesis gas stream as required in the context of the present invention. Suitable synthesis gas processes are generally known to those of ordinary skill in the relevant art, and many applicable technologies are commercially available.

Non-limiting examples of different types of suitable synthesis gas generation processes are discussed below. These may be used individually or in combination. All synthesis gas generation process will involve a reactor, which is generically depicted as (110) in FIG. 2, where a carbonaceous feedstock (10) will be processed to produce synthesis gases, which may be further treated prior to acid gas removal. General reference can be made to FIG. 2 in the context of the various synthesis gas generating processes described below.

Gas-Based Methane Reforming/Partial Oxidation

In one embodiment, the synthesis gas generating process is based on a gas-fed methane partial oxidation/reforming process, such as non-catalytic gaseous partial oxidation, catalytic autothermal reforming or catalytic stream-methane reforming process. These processes are generally well-known in the relevant art. See, for example, Rice and Mann, "Autothermal Reforming of Natural Gas to Synthesis Gas, Reference: KBR Paper #2031," Sandia National Laboratory Publication No. SAND2007-2331 (2007); and Bogdan, "Reactor Modeling and Process Analysis for Partial Oxidation of Natural Gas", printed by Febodruk, B. V., ISBN: 90-365-2100-9 (2004).

Technologies and reactors potentially suitable for use in conjunction with the present invention are commercially available from Royal Dutch Shell plc, Siemens AG, General Electric Company, Lurgi AG, Haldor Topsoe A/S, Uhde AG, KBR Inc. and others.

These gas-based processes convert a gaseous methane-containing stream as a carbonaceous feedstock (10, FIG. 2), in a reactor (110) into a syngas (hydrogen plus carbon monoxide) as synthesis gas stream (50) which, depending on the specific process, will have differing ratios of hydrogen:carbon monoxide, will generally contain minor amounts of carbon dioxide, and may contain minor amounts of other gaseous components such as steam.

The methane-containing stream useful in these processes comprises methane in a predominant amount, and may comprise other gaseous hydrocarbon and components. Examples of commonly used methane-containing streams include natural gas and synthetic natural gas.

In non-catalytic gaseous partial oxidation and autothermal reforming, an oxygen-rich gas stream (12) is fed into the reactor (110) along with carbonaceous feedstock (10). Optionally, steam (14) may also be fed into the reactor (110). In steam-methane reforming, steam (14) is fed into the reactor along with the carbonaceous feedstock (10). In some cases, minor amounts of other gases such as carbon dioxide, hydrogen and/or nitrogen may also be fed in the reactor (110).

Reaction and other operating conditions, and equipment and configurations, of the various reactors and technologies are in a general sense known to those of ordinary skill in the relevant art, and are not critical to the present invention in its broadest sense.

Solids/Liquids-Based Gasification to Syngas

In another embodiment, the synthesis gas generating process is based on a non-catalytic thermal gasification process, such as a partial oxidation gasification process (like an oxygen-blown gasifier), where a non-gaseous (liquid, semi-solid and/or solid) hydrocarbon is utilized as the carbonaceous feedstock (10). A wide variety of biomass and non-biomass materials (as described above) can be utilized as the carbonaceous feedstock (10) in these processes.

Oxygen-blown solids/liquids gasifiers potentially suitable for use in conjunction with the present invention are, in a general sense, known to those of ordinary skill in the relevant art and include, for example, those based on technologies available from Royal Dutch Shell plc, ConocoPhillips Company, Siemens AG, Lurgi AG (Sasol), General Electric Company and others. Other potentially suitable syngas generators are disclosed, for example, in US2009/0018222A1, US2007/0205092A1 and U.S. Pat. No. 6,863,878.

These processes convert a solid, semi-solid and/or liquid carbonaceous feedstock (10, FIG. 2), in a reactor (110) such as an oxygen-blown gasifier, into a syngas (hydrogen plus carbon monoxide) as synthesis gas stream (50) which, depending on the specific process and carbonaceous feedstock, will have differing ratios of hydrogen:carbon monoxide, will generally contain minor amounts of carbon dioxide, and may contain minor amounts of other gaseous components such as methane, steam, sulfur oxides and nitrogen oxides.

In certain of these processes, an oxygen-rich gas stream (12) is fed into the reactor (110) along with the carbonaceous feedstock (10). Optionally, steam (14) may also be fed into the reactor (110), as well as other gases such as carbon dioxide, hydrogen, methane and/or nitrogen.

In certain of these processes, steam (14) may be utilized as an oxidant at elevated temperatures in place of all or a part of the oxygen-rich gas stream (12).

The gasification in the reactor (110) will typically occur in a fluidized bed of the carbonaceous feedstock (10) that is fluidized by the flow of the oxygen-rich gas stream (12), steam (14) and/or other fluidizing gases (like carbon dioxide and/or nitrogen) that may be fed to reactor (110).

Typically, thermal gasification is a non-catalytic process, so no gasification catalyst needs to be added to the carbonaceous feedstock (10) or into the reactor (110); however, a catalyst that promotes syngas formation may be utilized.

These thermal gasification processes are typically operated under high temperature and pressure conditions, and may run under slagging or non-slagging operating conditions depending on the process and carbonaceous feedstock.

Reaction and other operating conditions, and equipment and configurations, of the various reactors and technologies are in a general sense known to those of ordinary skill in the relevant art, and are not critical to the present invention in its broadest sense.

Catalytic Gasification/Hydromethanation to a Methane-Enriched Gas

In another alternative embodiment, the synthesis gas generating process is a catalytic gasification/hydromethanation process, in which gasification of a non-gaseous carbonaceous feedstock (10) takes place in a reactor (110) in the presence of steam and a catalyst to result in a methane-enriched gas stream as the synthesis gas stream (50), which typically comprises methane, hydrogen, carbon monoxide, carbon dioxide and steam.

The hydromethanation of a carbon source to methane typically involves four concurrent reactions:

Steam carbon: $C+H_2O \rightarrow CO+H_2$      (I)

Water-gas shift: $CO+H_2O \rightarrow H_2+CO_2$      (II)

CO Methanation: $CO+3H_2 \rightarrow CH_4+H_2O$      (III)

Hydro-gasification: $2H_2+C \rightarrow CH_4$      (IV)

In the hydromethanation reaction, the first three reactions (I-III) predominate to result in the following overall reaction:

$$2C+2H_2O \rightarrow CH_4+CO_2 \quad \quad (V).$$

The overall reaction is essentially thermally balanced; however, due to process heat losses and other energy requirements (such as required for evaporation of moisture entering the reactor with the feedstock), some heat must be added to maintain the thermal balance.

The reactions are also essentially syngas (hydrogen and carbon monoxide) balanced (syngas is produced and consumed); therefore, as carbon monoxide and hydrogen are withdrawn with the product gases, carbon monoxide and hydrogen need to be added to the reaction as required to avoid a deficiency.

In order to maintain the net heat of reaction as close to neutral as possible (only slightly exothermic or endothermic), and maintain the syngas balance, a superheated gas stream of steam (14) and syngas (16) (carbon monoxide and hydrogen) is often fed to the reactor (110). Frequently, the carbon monoxide and hydrogen streams are recycle streams separated from the product gas, and/or are provided by reforming a portion of the product methane.

The carbonaceous feedstocks useful in these processes include, for example, a wide variety of biomass and non-biomass materials.

Catalysts utilized in these processes include, for example, alkali metals, alkaline earth metals and transition metals, and compounds, mixtures and complexes thereof.

The temperature and pressure operating conditions in a catalytic gasification/hydromethanation process are typically milder (lower temperature and pressure) than a non-catalytic gasification process, which can sometimes have advantages in terms of cost and efficiency.

Catalytic gasification/hydromethanation processes and conditions are disclosed, for example, in U.S. Pat. No. 3,828,474, U.S. Pat. No. 3,998,607, U.S. Pat. No. 4,057,512, U.S. Pat. No. 4,092,125, U.S. Pat. No. 4,094,650, U.S. Pat. No. 4,204,843, U.S. Pat. No. 4,468,231, U.S. Pat. No. 4,500,323, U.S. Pat. No. 4,541,841, U.S. Pat. No. 4,551,155, U.S. Pat. No. 4,558,027, U.S. Pat. No. 4,606,105, U.S. Pat. No. 4,617,027, U.S. Pat. No. 4,609,456, U.S. Pat. No. 5,017,282, U.S. Pat. No. 5,055,181, U.S. Pat. No. 6,187,465, U.S. Pat. No. 6,790,430, U.S. Pat. No. 6,894,183, U.S. Pat. No. 6,955,695, US2003/0167961A1 and US2006/0265953A1, as well as in commonly owned US2007/0000177A1, US2007/0083072A1, US2007/0277437A1, US2009/0048476A1, US2009/0090056A1, US2009/0090055A1, US2009/0165383A1, US2009/0166588A1, US2009/0165379A1, US2009/0170968A1, US2009/0165380A1, US2009/0165381A1, US2009/0165361A1, US2009/0165382A1, US2009/0169449A1, US2009/0169448A1, US2009/0165376A1, US2009/0165384A1, US2009/0217582A1, US2009/0220406A1, US2009/0217590A1, US2009/0217586A1, US2009/0217588A1, US2009/0218424A1, US2009/0217589A1, US2009/0217575A1, US2009/0229182A1, US2009/0217587A1,
US2009/0246120A1, US2009/0260287A1, US2009/0259080A1, US2009/0324458A1, US2009/0324459A1, US2009/0324460A1, US2009/0324461A1, US2009/0324462A1, US2010/0121125A1, US2010/0120926A1, US2010/0071262A1, US2010/0076235A1, US2010/0179232A1, US2010/0168495A1 and US2010/0168494A1; US patent applications Ser. Nos. 12/778,538 (entitled PROCESS FOR HYDROMETHANATION OF A CARBONACEOUS FEEDSTOCK, published as US2010/0292350A1, now US8268899), 12/778,548 (entitled PROCESSES FOR HYDROMETHANATION OF A CARBON- ACEOUS FEEDSTOCK, published as US2010/0287836A1) and 12/778,552 (entitled PROCESSES FOR HYDROMETHANATION OF A CARBONACEOUS FEEDSTOCK, published as US2010/0287835A1), each of which was filed 12 May 2010; US patent application Ser. No. 12/851,864 (entitled PROCESS FOR HYDROMETHANATION OF A CARBONACEOUS FEEDSTOCK, published as US2011/0031439A1), which was filed 6 Aug. 2009; and US patent applications Ser. Nos. 12/882,415 (entitled PROCESS FOR HYDROMETHANATION OF A CARBONACEOUS FEEDSTOCK, published as US2011/0062012A1), 12/882,412 (entitled INTEGRATED HYDROMETHANATION COMBINED CYCLE PROCESS, published as US2011/0062722A1), 12/882,408 (entitled INTEGRATED HYDROMETHANATION COMBINED CYCLE PROCESS, published as US2011/0062721A1) and 12/882,417 (entitled PROCESS FOR HYDROMETHANATION OF A CARBONACEOUS FEEDSTOCK, published as US2011/0064648A1), each of which was filed 15 Sep. 2010.

General reaction and other operating conditions of the various catalytic gasification/hydromethanation reactors and technologies can be found from the above references, and are not critical to the present invention in its broadest sense.

Heat Exchange (140)

All of the above described synthesis gas generation processes typically will generate a synthesis gas stream (50) of a temperature higher than suitable for feeding downstream gas processes (including second acid gas absorber unit (210)), so upon exit from reactor (110) the synthesis gas stream (50) is typically passed through a heat exchanger unit (140) to remove heat energy and generate a cooled synthesis gas stream (52).

The heat energy recovered in heat exchanger unit (140) can be used, for example, to generate steam and/or superheat various process streams, as will be recognized by a person of ordinary skill in the art. Any steam generated can be used for internal process requirements and/or used to generate electrical power.

In one embodiment, the resulting cooled synthesis gas stream (52) will typically exit heat exchanger unit (140) at a temperature ranging from about 450° F. (about 232° C.) to about 1100° F. (about 593° C.), more typically from about 550° F. (about 288° C.) to about 950° F. (about 510° C.), and at a pressure suitable for subsequent acid gas removal processing (taking into account any intermediate processing). Typically, this pressure will be from about 50 psig (about 446 kPa) to about 800 psig (about 5617 kPa), more typically from about 400 psig (about 2860 kPa) to about 600 psig (about 4238 kPa).

Gas Treatment Prior to Acid Gas Removal

Synthesis gas stream (50) and gaseous hydrocarbon stream (84) may be processed in various treatment processes, which will be primarily dependent on the composition, temperature and pressure of the two streams, and any desired end products.

Processing options prior to acid gas removal typically include, for example, one or more of sour shift (700) (water gas shift), contaminant removal (710) and dehydration (720 and 720a). While these intermediate processing steps can occur in any order, dehydration (720 and 720a) will usually occur just prior to acid gas removal (last in the series), as a substantial portion of any water in synthesis gas stream (50) and gaseous hydrocarbon stream (84) desirably should be removed prior to treatment in acid gas absorber units (210 and 230).

Typically, the gaseous hydrocarbon stream (84) will require at least some compression prior to treatment in first acid gas absorber unit (230).

Sour Shift (700)

In certain embodiments, particularly where a stream contains appreciable amounts of carbon monoxide, and it is desired to maximize hydrogen and/or carbon dioxide production, all or a part of such stream (such as synthesis gas stream (50)) can be supplied to a sour shift reactor (700).

In sour shift reactor (700), the gases undergo a sour shift reaction (also known as a water-gas shift reaction) in the presence of an aqueous medium (such as steam) to convert at least a predominant portion (or a substantial portion, or substantially all) of the CO to $CO_2$, which also increases the fraction of $H_2$ in order to produce a hydrogen-enriched stream (54).

A sour shift process is described in detail, for example, in U.S. Pat. No. 7,074,373. The process involves adding water, or using water contained in the gas, and reacting the resulting water-gas mixture adiabatically over a steam reforming catalyst. Typical steam reforming catalysts include one or more Group VIII metals on a heat-resistant support.

Methods and reactors for performing the sour gas shift reaction on a CO-containing gas stream are well known to those of skill in the art. Suitable reaction conditions and suitable reactors can vary depending on the amount of CO that must be depleted from the gas stream. In some embodiments, the sour gas shift can be performed in a single stage within a temperature range from about 100° C., or from about 150° C., or from about 200° C., to about 250° C., or to about 300° C., or to about 350° C. In these embodiments, the shift reaction can be catalyzed by any suitable catalyst known to those of skill in the art. Such catalysts include, but are not limited to, $Fe_2O_3$-based catalysts, such as $Fe_2O_3$—$Cr_2O_3$ catalysts, and other transition metal-based and transition metal oxide-based catalysts. In other embodiments, the sour gas shift can be performed in multiple stages. In one particular embodiment, the sour gas shift is performed in two stages. This two-stage process uses a high-temperature sequence followed by a low-temperature sequence. The gas temperature for the high-temperature shift reaction ranges from about 350° C. to about 1050° C. Typical high-temperature catalysts include, but are not limited to, iron oxide optionally combined with lesser amounts of chromium oxide. The gas temperature for the low-temperature shift ranges from about 150° C. to about 300° C., or from about 200° C. to about 250° C. Low-temperature shift catalysts include, but are not limited to, copper oxides that may be supported on zinc oxide or alumina. Suitable methods for the sour shift process are described in previously incorporated US2009/0246120A1.

The sour shift reaction is exothermic, so it is often carried out with a heat exchanger (not depicted) to permit the efficient use of heat energy. Shift reactors employing these features are well known to those of skill in the art. Recovered heat energy can be used, for example, to generate steam, superheat various process streams and/or preheat boiler feed water for use in other steam generating operations. An example of a suitable shift reactor is illustrated in previously incorporated U.S. Pat. No. 7,074,373, although other designs known to those of skill in the art are also effective.

If sour shift is present and it is desired to retain some carbon monoxide content, a portion of the stream can be split off to bypass sour shift reactor (700) and be combined with hydrogen-enriched stream (54) at some point prior to second acid gas absorber unit (210). This is particularly useful when it is desired to recover a separate methane by-product, as the retained carbon monoxide can be subsequently methanated as discussed below.

Contaminant Removal (710)

As is familiar to those skilled in the art, the contamination levels of synthesis gas stream (50) will depend on the nature of the carbonaceous feedstock and the synthesis gas generation conditions. For example, petcoke and certain coals can have high sulfur contents, leading to higher sulfur oxide (SOx), $H_2S$ and/or COS contamination. Certain coals can contain significant levels of mercury which can be volatilized during the synthesis gas generation. Other feedstocks can be high in nitrogen content, leading to ammonia, nitrogen oxides (NOx) and/or cyanides.

Some of these contaminants are typically removed in second acid gas absorber unit (210), such as $H_2S$ and COS. Others such as ammonia and mercury, require removal prior to second acid gas absorber unit (210).

When present, contaminant removal of a particular contaminant should remove at least a substantial portion (or substantially all) of that contaminant from the so-treated cleaned gas stream (56), typically to levels at or lower than the specification limits for the desired second acid gas absorber unit (210), or the desired end product.

While not shown in FIG. 2, gaseous hydrocarbon stream (84) may be treated separately for contaminant removal as needed.

Contaminant removal process are in a general sense well know to those of ordinary skill in the relevant art, as exemplified in many of the previously-incorporated references.
Dehydration (720 and 720a)

In addition, prior to acid gas removal, the synthesis gas stream (50) and gaseous hydrocarbon stream (84) should be treated to reduced residual water content via a dehydration unit (720) and (720a) to produce a dehydrated stream (58) and (58a) for feeding to second acid gas absorber unit (210) and first acid gas absorber unit (230), respectively.

Examples of suitable dehydration units include a knockout drum or similar water separation device, and/or water absorption processes such as glycol treatment.

Such dehydration units and processes again are in a general sense well known to those of ordinary skill in the relevant art.
Acid Gas Removal In accordance with the present invention, the synthesis gas stream (50) and the gaseous hydrocarbon stream (84) (or derivative streams resulting from intermediate treatment) are processed in an acid gas removal unit to remove carbon dioxide and other acid gases (such as hydrogen sulfide if present), and generate a carbon dioxide-rich recycle stream (87), an acid gas-depleted gaseous hydrocarbon product stream (31) and an acid gas-depleted synthesis gas stream (30).

As indicated previously, the synthesis gas stream (50) and the gaseous hydrocarbon stream (84) are first individually treated in a second acid gas absorber unit (210) and a first acid gas absorber unit (230), respectively, to generate a separate acid gas-depleted synthesis gas stream (30) and second acid gas-rich absorber stream (35), and a separate acid gas-depleted gaseous hydrocarbon product stream (31) and first acid gas-rich absorber stream (36).

The resulting acid gas-depleted gaseous hydrocarbon product stream (31) and an acid gas-depleted synthesis gas stream (30) may be co-processed or separately processed as described further below.

The resulting first acid gas-rich absorber stream (36) and second acid gas-rich absorber stream (35) are co-processed in an absorber regeneration unit (250) to ultimately result in an acid gas stream containing the combined acid gases (and other contaminants) removed from both synthesis gas stream (50) and gaseous hydrocarbon stream (84). First acid gas-rich absorber stream (36) and second acid gas-rich absorber stream (35) may be combined prior to or within absorber regeneration unit (250) for co-processing.

Ultimately, a carbon dioxide-rich recycle stream (87) is generated containing a substantial portion of carbon dioxide from both synthesis gas stream (50) and gaseous hydrocarbon stream (84). An acid gas-lean absorber stream (70) is also generated, which can be recycled back to one or both of first acid gas absorber unit (230) and second acid gas absorber unit (210) along with make-up absorber as required. If one or both of synthesis gas stream (50) and gaseous hydrocarbon stream (84) contain other acid gas contaminants, such as hydrogen sulfide, then an additional stream may be generated, such as hydrogen sulfide stream (88).

Acid gas removal processes typically involve contacting a gas stream with a solvent such as monoethanolamine, diethanolamine, methyldiethanolamine, diisopropylamine, diglycolamine, a solution of sodium salts of amino acids, methanol, hot potassium carbonate or the like to generate $CO_2$ and/or $H_2S$ laden absorbers. One method can involve the use of Selexol® (UOP LLC, Des Plaines, Ill. USA) or Rectisol® (Lurgi AG, Frankfurt am Main, Germany) solvent having two trains; each train containing an $H_2S$ absorber and a $CO_2$ absorber.

One method for removing acid gases is described in previously incorporated US2009/0220406A1.

At least a substantial portion (e.g., substantially all) of the $CO_2$ and/or $H_2S$ (and other remaining trace contaminants) should be removed via the acid gas removal processes. "Substantial" removal in the context of acid gas removal means removal of a high enough percentage of the component such that a desired end product can be generated. The actual amounts of removal may thus vary from component to component. Desirably, only trace amounts (at most) of $H_2S$ should be present in the acid gas-depleted gaseous hydrocarbon product stream, although higher amounts of $CO_2$ may be tolerable depending on the desired end product.

Typically, at least about 85%, or at least about 90%, or at least about 92%, of the $CO_2$, and at least about 95%, or at least about 98%, or at least about 99.5%, of the $H_2S$, should be removed, based on the amount of those components contained in the streams fed to the acid gas removal.

Any recovered $H_2S$ (88) from the acid gas removal can be converted to elemental sulfur by any method known to those skilled in the art, including the Claus process. Sulfur can be recovered as a molten liquid.
Compression (400)

As discussed above, the recovered carbon dioxide-rich recycle stream (87) is in whole or in part compressed via compressor (400) to generate pressurized carbon dioxide stream (89) for the EOR portion of the process. A $CO_2$ product stream (90) can also optionally be split off of carbon dioxide-rich recycle stream (87) and/or pressurized carbon dioxide stream (89).

Suitable compressors for compressing carbon dioxide-rich recycle stream (87) to appropriate pressures and conditions for EOR are in a general sense well-known to those of ordinary skill in the relevant art.
Acid Gas-Depleted Synthesis Gas Stream (30) and Acid Gas-Depleted Gaseous Hydrocarbon Product Stream (31)

The resulting acid gas-depleted gaseous hydrocarbon product stream (31) will generally comprise $CH_4$ and other gaseous hydrocarbons from the gaseous hydrocarbon stream (84), and typically no more than contaminant amounts of $CO_2$, $H_2O$, $H_2S$ and other contaminants. The resulting acid gas-depleted synthesis gas stream (30) will generally comprise one or both of $CH_4$ and $H_2$, and optionally CO (for the downstream methanation), and typically no more than contaminant amounts of $CO_2$, $H_2O$, $H_2S$ and other contaminants.

All or a portion of these two streams individually, or combined in whole or in part, may be processed to end products or for end uses as are well known to those of ordinary skill in the relevant art. The two streams may be combined at various points subsequent to acid gas removal.

Non-limiting options are discussed below in reference to FIG. 2. Although FIG. 2 only depicts some of the options as applied to acid gas-depleted synthesis gas stream (30), these options (and others) may be applied to gas-depleted gaseous hydrocarbon product stream (31) (or a combined stream) where appropriate.

Optional Further Processing

Hydrogen Separation (730)

If present, hydrogen may be separated from all or a portion of acid gas-depleted synthesis gas stream (30) (and/or the acid gas-depleted gaseous hydrocarbon product stream (31)) according to methods known to those skilled in the art, such as cryogenic distillation, the use of molecular sieves, gas separation (e.g., ceramic or polymeric) membranes, and/or pressure swing adsorption (PSA) techniques.

In one embodiment, a PSA device is utilized for hydrogen separation. PSA technology for separation of hydrogen from gas mixtures containing methane (and optionally carbon monoxide) is in general well-known to those of ordinary skill in the relevant art as disclosed, for example, in U.S. Pat. No. 6,379,645 (and other citations referenced therein). PSA devices are generally commercially available, for example, based on technologies available from Air Products and Chemicals Inc. (Allentown, Pa.), UOP LLC (Des Plaines, Ill.) and others.

In another embodiment, a hydrogen membrane separator can be used followed by a PSA device.

Such separation provides a high-purity hydrogen product stream (72) and a hydrogen-depleted gas stream (74).

The recovered hydrogen product stream (72) preferably has a purity of at least about 99 mole %, or at least 99.5 mole %, or at least about 99.9 mole %.

The recovered hydrogen can be used, for example, as an energy source and/or as a reactant. For example, the hydrogen can be used as an energy source for hydrogen-based fuel cells, or for power and/or steam generation (760). The hydrogen can also be used as a reactant in various hydrogenation processes, such as found in the chemical and petroleum refining industries.

The hydrogen-depleted gas stream (74) will substantially comprise light hydrocarbons, such as methane (and generally predominantly methane, or substantially methane), with optional minor amounts of carbon monoxide (depending primarily on the extent of the sour shift reaction and bypass), carbon dioxide (depending primarily on the effectiveness of the acid gas removal process) and hydrogen (depending primarily on the extent and effectiveness of the hydrogen separation technology), and can be further processed/utilized as described below.

Methanation (740)

If the acid gas-depleted synthesis gas stream (30) (and/or the acid gas-depleted gaseous hydrocarbon product stream (31), and/or the hydrogen-depleted sweetened gas stream (74)) contains carbon monoxide and hydrogen, all or part of the stream may be fed to a (trim) methanation unit (740) to generate additional methane from the carbon monoxide and hydrogen, resulting in a methane-enriched gas stream (75).

The methanation reaction can be carried out in any suitable reactor, e.g., a single-stage methanation reactor, a series of single-stage methanation reactors or a multistage reactor. Methanation reactors include, without limitation, fixed bed, moving bed or fluidized bed reactors. See, for instance, U.S. Pat. No. 3,958,957, U.S. Pat. No. 4,252,771, U.S. Pat. No. 3,996,014 and U.S. Pat. No. 4,235,044. Methanation reactors and catalysts are generally commercially available. The catalyst used in the methanation, and methanation conditions, are generally known to those of ordinary skill in the relevant art, and will depend, for example, on the temperature, pressure, flow rate and composition of the incoming gas stream.

As the methanation reaction is exothermic, the methane-enriched gas stream (75) may be, for example, further provided to a heat exchanger unit (750). While the heat exchanger unit (750) is depicted as a separate unit, it can exist as such and/or be integrated into methanation unit (740), thus being capable of cooling the methanation unit (740) and removing at least a portion of the heat energy from the methane-enriched stream (75) to reduce the temperature and generate a cooled methane-enriched stream (76). The recovered heat energy can be utilized, for example, to generate a process steam stream from a water and/or steam source.

All or part of the methane-enriched stream (75) can be recovered as a methane product stream (77) or, it can be further processed, when necessary, to separate and recover $CH_4$ by any suitable gas separation method known to those skilled in the art including, but not limited to, cryogenic distillation and the use of molecular sieves or gas separation (e.g., ceramic) membranes.

Pipeline-Quality Natural Gas

In certain embodiments, the acid gas-depleted synthesis gas stream (30), the acid gas-depleted hydrocarbon stream (31), the hydrogen-depleted gas stream (74), the methane-enriched gas stream (75), and/or a combination of the above, is a "pipeline-quality natural gas". A "pipeline-quality natural gas" typically refers to a methane-containing gas that is (1) within ±5% of the heating value of pure methane (whose heating value is 1010 btu/ft$^3$ under standard atmospheric conditions), (2) substantially free of water (typically a dew point of about −40° C. or less), and (3) substantially free of toxic or corrosive contaminants.

Uses of Gaseous Hydrocarbon Product Streams

All or a portion of the acid gas-depleted synthesis gas stream (30) and/or acid gas-depleted gaseous hydrocarbon product stream (31) (or derivative product stream as discussed above) can, for example, be utilized for combustion and/or steam generation in a power generation block (760), for example, to produce electrical power (79) which may be either utilized within the plant or can be sold onto the power grid.

All or a portion of these streams can also be used as a recycle hydrocarbon stream (78), for example, for use as carbonaceous feedstock (10) in a gaseous partial oxidation/methane reforming process, or for the generation of syngas feed stream (16) for use in a hydromethanation process (in, for example, a gaseous partial oxidation/methane reforming process). Both of these uses can, for example, ultimately result in an optimized production of hydrogen product stream (72), and carbon dioxide-rich recycle stream (87).

Examples of Specific Embodiments

In one embodiment, the synthesis gas stream is produced by a catalytic steam methane reforming process utilizing a methane-containing stream as the carbonaceous feedstock.

In another embodiment, the synthesis gas stream is produced by a non-catalytic (thermal) gaseous partial oxidation process utilizing a methane-containing stream as the carbonaceous feedstock.

In another embodiment, the synthesis gas stream is produced by a catalytic autothermal reforming process utilizing a methane-containing stream as the carbonaceous feedstock.

The methane-containing stream for use in these processes may be a natural gas stream, a synthetic natural gas stream or a combination thereof. In one embodiment, the methane-containing stream comprises all or a portion of the acid gas-depleted gaseous hydrocarbon product stream, the acid gas-depleted synthesis gas stream, a combination of these streams, and/or a derivative of one or both of these streams after downstream processing.

The resulting synthesis gas stream from these processes will typically comprise at least hydrogen and one or both of carbon monoxide and carbon dioxide, depending on gas processing prior to acid gas removal.

In another embodiment, the synthesis gas stream is produced by a non-catalytic thermal gasification process utilizing a non-gaseous carbonaceous material as the carbonaceous feedstock, such as coal, petcoke, biomass and mixtures thereof.

The resulting synthesis gas stream from this process will typically comprise at least hydrogen and one or both of carbon monoxide and carbon dioxide, depending on gas processing prior to acid gas removal.

In another embodiment, the synthesis gas stream is produced by a catalytic hydromethanation process utilizing a non-gaseous carbonaceous material as the carbonaceous feedstock, such as coal, petcoke, biomass and mixtures thereof.

The resulting synthesis gas stream from this process will typically comprise at least methane, hydrogen and carbon dioxide, and optionally carbon monoxide, depending on gas processing prior to acid gas removal.

In another embodiment, at least a portion of the synthesis gas stream is subject to a sour shift to generate a hydrogen-enriched stream. The hydrogen-enriched stream is subsequently treated in the acid gas removal step.

In another embodiment, the acid-gas depleted synthesis gas stream comprises hydrogen, and at least a portion of the hydrogen is separated to generate a hydrogen product stream and a hydrogen-depleted gas stream.

In another embodiment, this hydrogen-depleted gas stream is a pipeline-quality natural gas.

In another embodiment, the acid gas-depleted gaseous hydrocarbon product stream is a pipeline-quality natural gas.

In another embodiment, the acid-gas depleted synthesis gas stream comprises hydrogen and carbon monoxide, and is subject to a methanation to produce a methane-enriched gas stream, which can be a pipeline-quality natural gas.

In another embodiment, this hydrogen-depleted gas stream comprises hydrogen and carbon monoxide, and is subject to a methanation to produce a methane-enriched gas stream, which can be a pipeline-quality natural gas.

In another embodiment, at least a portion of the acid-gas depleted gaseous hydrocarbon product stream and/or the acid gas-depleted synthesis gas stream (or the hydrogen-depleted stream if present, or the methane-enriched stream if present), is the carbonaceous feedstock.

In another embodiment, at least a portion of the acid-gas depleted gaseous hydrocarbon product stream and/or acid gas-depleted synthesis gas stream (or the hydrogen-depleted stream if present, or the methane-enriched stream if present), is used to generate electrical power.

In another embodiment, at least a portion of the acid-gas depleted gaseous hydrocarbon product stream and/or acid gas-depleted synthesis gas stream (or the hydrogen-depleted stream if present, or the methane-enriched stream if present), is used to generate a syngas feed stream for use in a hydromethanation process.

In one embodiment, the synthesis gas stream and the gaseous hydrocarbon stream are subject to a dehydration prior to acid gas removal.

In one embodiment, the acid-gas lean absorber stream is recycled back to one or both of the first and second acid gas absorber units.

In an embodiment of the apparatus, the absorber regeneration unit is further adapted to (iv) provide the acid gas-lean absorber stream to one or both the first and second acid gas absorber units.

I claim:

1. An integrated process to (i) produce an acid gas-depleted gaseous hydrocarbon product steam, (ii) produce an acid gas-depleted synthesis gas stream, (iii) produce a liquid hydrocarbon product stream and (iv) enhance production of a hydrocarbon-containing fluid from an underground hydrocarbon reservoir, the process comprising the steps of:
   (1) injecting a pressurized carbon dioxide stream into an underground hydrocarbon reservoir to enhance production of the hydrocarbon-containing fluid from the underground hydrocarbon reservoir via a hydrocarbon production well, the hydrocarbon-containing fluid comprising carbon dioxide;
   (2) recovering the hydrocarbon-containing fluid produced from the hydrocarbon production well;
   (3) separating the hydrocarbon-containing fluid into (a) the liquid hydrocarbon product stream and (b) a gaseous hydrocarbon stream comprising carbon dioxide;
   (4) treating the gaseous hydrocarbon stream in a first acid gas absorber unit to produce the acid gas-depleted gaseous hydrocarbon product stream and a first acid gas-rich absorber stream;
   (5) producing a synthesis gas stream from a carbonaceous feedstock, the synthesis gas stream comprising (a) at least one of carbon monoxide and carbon dioxide, and (b) at least one of hydrogen and methane;
   (6) treating the synthesis gas stream in a second acid gas absorber unit to produce the acid gas-depleted synthesis gas stream and a second acid gas-rich absorber stream;
   (7) feeding the first acid gas-rich absorber stream and the second acid gas-rich absorber stream into an absorber regeneration unit to produce a carbon dioxide-rich recycle stream and an acid gas-lean absorber stream; and
   (8) pressurizing the carbon dioxide-rich recycle stream to generate the pressurized carbon dioxide stream.

2. The process of claim 1, wherein the carbonaceous feedstock is a gaseous methane-containing stream, and step (5) comprises the step of converting the gaseous methane-containing stream in a catalytic steam methane reforming process to a syngas as the synthesis gas stream.

3. The process of claim 1, wherein the carbonaceous feedstock is a gaseous methane-containing stream, and step (5) comprises the step of converting the gaseous methane-containing stream in a non-catalytic gaseous partial oxidation process to produce a syngas as the synthesis gas stream.

4. The process of claim 3, wherein the methane-containing stream comprises all or a portion of the acid gas-depleted gaseous hydrocarbon product stream, the acid gas-depleted synthesis gas stream, a combination of these streams, or a derivative of one or both of these streams after downstream processing.

5. The process of claim 1, wherein the carbonaceous feedstock is a gaseous methane-containing stream, and step (5) comprises the step of converting the gaseous methane-containing stream in a catalytic autothermal reforming process to produce a syngas as the synthesis gas stream.

6. The process of claim 5, wherein the methane-containing stream comprises all or a portion of the acid gas-depleted gaseous hydrocarbon product stream, the acid gas-depleted synthesis gas stream, a combination of these streams, or a derivative of one or both of these streams after downstream processing.

7. The process of claim 1, wherein the carbonaceous feedstock is a non-gaseous carbonaceous material, and step (5) comprises the step of converting the non-gaseous carbonaceous material in a non-catalytic thermal gasification process to produce a syngas as the synthesis gas stream.

8. The process of claim 1, wherein the synthesis gas stream comprises hydrogen and one or both of carbon monoxide and carbon dioxide.

9. The process of claim 1, wherein the carbonaceous feedstock is a non-gaseous carbonaceous material, and step (5) comprises the step of converting the non-gaseous carbonaceous material in a catalytic hydromethanation process to produce a methane-enriched gas stream as the synthesis gas stream.

10. The process of claim 1, wherein the synthesis gas stream comprises methane, hydrogen and carbon dioxide.

11. The process of claim 1, wherein at least a portion of the synthesis gas stream is subject to a sour shift to generate a hydrogen-enriched stream.

12. The process of claim 1, wherein the acid-gas depleted synthesis gas stream comprises hydrogen, and at least a portion of the hydrogen is separated to generate a hydrogen product stream and a hydrogen-depleted gas stream.

13. The process of claim 1, wherein the acid-gas depleted synthesis gas stream comprises hydrogen and carbon monoxide, and is subject to a methanation to produce a methane-enriched gas stream.

14. The process of claim 1, wherein at least a portion of the acid-gas depleted gaseous hydrocarbon product stream is the carbonaceous feedstock.

15. The process of claim 1, wherein the synthesis gas stream and the gaseous hydrocarbon stream are subject to a dehydration prior to acid gas removal.

16. The process of claim 1, wherein the acid-gas lean absorber stream is recycled back to one or both of the first and second acid gas absorber units.

17. A process to enhance production of a hydrocarbon-containing fluid from an underground hydrocarbon reservoir via a hydrocarbon production well, by injecting a pressurized carbon dioxide stream into an underground hydrocarbon reservoir, wherein the hydrocarbon-containing fluid comprises carbon dioxide, and wherein the pressurized carbon dioxide stream is generated by a process comprising the steps of:
    (I) recovering the hydrocarbon-containing fluid produced from the hydrocarbon production well;
    (II) splitting the hydrocarbon-containing fluid into (a) a liquid hydrocarbon product stream and (b) a gaseous hydrocarbon stream comprising carbon dioxide;
    (III) treating the gaseous hydrocarbon stream in a first acid gas absorber unit to produce an acid gas-depleted gaseous hydrocarbon product stream and a first acid gas-rich absorber stream;
    (IV) producing a synthesis gas stream from a carbonaceous feedstock, the synthesis gas stream comprising (a) at least one of carbon monoxide and carbon dioxide, and (b) at least one of hydrogen and methane;
    (V) treating the synthesis gas stream in a second acid gas absorber unit to produce an acid gas-depleted synthesis gas stream and a second acid gas-rich absorber stream;
    (VI) feeding the first acid gas-rich absorber stream and the second acid gas-rich absorber stream into an absorber regeneration unit to produce a carbon dioxide-rich recycle stream and an acid gas-lean absorber stream; and
    (VII) pressurizing the carbon dioxide-rich recycle stream to generate the pressurized carbon dioxide stream.

18. An apparatus for generating a liquid hydrocarbon product stream, an acid gas-depleted gaseous hydrocarbon product stream and an acid gas-depleted synthesis gas stream, the apparatus comprising:
    (A) a synthesis gas production system adapted to produce a synthesis gas from a carbonaceous feedstock, the synthesis gas comprising (i) at least one of carbon monoxide and carbon dioxide, and (ii) at least one of hydrogen and methane;
    (B) a carbon dioxide injection well in fluid communication with an underground hydrocarbon reservoir, the carbon dioxide injection well adapted to inject a pressurized carbon dioxide stream into the underground hydrocarbon reservoir for enhanced oil recovery;
    (C) a hydrocarbon production well in fluid communication with the underground hydrocarbon reservoir, the hydrocarbon production well adapted to remove a hydrocarbon fluid from the underground hydrocarbon reservoir, the hydrocarbon fluid comprising carbon dioxide;
    (D) a separation device in fluid communication with the hydrocarbon production well, the separation device adapted (i) to receive the hydrocarbon fluid from the hydrocarbon production well, and (ii) to separate the hydrocarbon fluid into the liquid hydrocarbon product stream and a gaseous hydrocarbon stream comprising carbon dioxide;
    (E) a first acid gas absorber unit in fluid communication with the separation device, the first acid gas absorber unit adapted to (i) receive the gaseous hydrocarbon stream from the separation device, and (ii) treat the gaseous hydrocarbon stream to remove acid gases and produce the acid gas-depleted gaseous hydrocarbon product stream and a first acid gas-rich absorber stream;
    (F) a second acid gas absorber unit in fluid communication with the synthesis gas production system, the second acid gas absorber unit adapted to (i) receive the synthesis gas from the synthesis gas production system, and (ii) treat the synthesis gas to remove acid gases and produce the acid gas-depleted synthesis gas stream and a second acid gas-rich absorber stream;
    (G) an absorber regeneration unit in fluid communication with the first acid gas absorber unit and the second acid gas absorber unit, the absorber regeneration unit adapted to (i) receive the first acid gas-rich absorber stream from the first acid gas absorber unit and the second acid gas-rich absorber stream from the second acid gas absorber unit, (ii) remove acid gases from the first acid gas-rich absorber stream and the second acid gas-rich absorber stream, and (iii) generate an acid gas-lean absorber stream and a carbon dioxide-rich recycle stream; and
    (H) a compressor unit in fluid communication with the absorber regeneration unit and the carbon dioxide injection well, the compressor unit adapted to (i) receive the carbon dioxide-rich recycle stream, and (ii) compress the carbon dioxide recycle stream to generate the pressurized carbon dioxide stream, and (iii) provide the pressurized carbon dioxide stream to the carbon dioxide injection well.

19. The apparatus of claim 18, further comprising a sour shift unit between the synthesis gas production system and the second acid gas absorber unit.

20. The apparatus of claims 18, wherein the absorber regeneration unit is further adapted to (iv) provide the acid gas-lean absorber stream to one or both the first and second acid gas absorber units.

* * * * *